US012736771B2

(12) United States Patent
Kim et al.

(10) Patent No.: US 12,736,771 B2
(45) Date of Patent: Sep. 15, 2026

(54) CAMERA MODULE AND ELECTRONIC DEVICE HAVING SAME

(71) Applicant: Samsung Electronics Co., Ltd., Suwon-si (KR)

(72) Inventors: Sungmin Kim, Suwon-si (KR); Youngjae Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 376 days.

(21) Appl. No.: 18/333,142

(22) Filed: Jun. 12, 2023

(65) Prior Publication Data

US 2023/0384556 A1 Nov. 30, 2023

Related U.S. Application Data

(63) Continuation of application No. PCT/KR2023/007311, filed on May 26, 2023.

(30) Foreign Application Priority Data

May 27, 2022 (KR) ........................ 10-2022-0065538
Sep. 7, 2022 (KR) ........................ 10-2022-0113495

(51) Int. Cl.
*G02B 7/08* (2021.01)
*G02B 7/28* (2021.01)
(Continued)

(52) U.S. Cl.
CPC ................. *G02B 7/08* (2013.01); *G02B 7/28* (2013.01); *G03B 13/36* (2013.01); *H02K 11/215* (2016.01);
(Continued)

(58) Field of Classification Search
CPC .......... G02B 7/08; G02B 7/28; H02K 11/215; H02K 11/33; H02K 11/35; H02K 41/0354; H02P 7/025; H04N 23/51; G03B 13/36
See application file for complete search history.

(56) References Cited

U.S. PATENT DOCUMENTS 10,491,827 B2 11/2019 Saito et al.
10,567,628 B2 2/2020 Shimatani et al.
(Continued)

FOREIGN PATENT DOCUMENTS

JP 2010-204575 A 9/2010
JP 2020-95217 A 6/2020
(Continued)

OTHER PUBLICATIONS

International Search Report dated Sep. 4, 2023, issued in International Patent Application No. PCT/PCT/KR2023/007311.
(Continued)

*Primary Examiner* — Stephone B Allen
*Assistant Examiner* — Tamara Y. Washington
(74) *Attorney, Agent, or Firm* — Jefferson IP Law, LLP

(57) ABSTRACT

An electronic device is provided. The electronic device includes a housing, a lens assembly disposed along an optical axis, and an AF actuator. The AF actuator includes a first AF magnet disposed on a first surface of the lens assembly facing a first direction, a second AF magnet disposed on a second surface facing a direction opposite to the first direction with respect to the lens assembly, a first AF coil disposed inside the housing to face the first AF magnet, a first driving circuit disposed at the center of the first AF coil to control a current applied to the first AF coil, a second AF coil disposed inside the housing to face the second AF magnet, and a second driving circuit disposed at the center
(Continued)

of the second AF coil to control a current applied to the second AF coil.

20 Claims, 14 Drawing Sheets

(51) Int. Cl.

| | |
|---|---|
| ***G03B 13/36*** | (2021.01) |
| ***H02K 11/215*** | (2016.01) |
| ***H02K 11/33*** | (2016.01) |
| ***H02K 11/35*** | (2016.01) |
| ***H02K 41/035*** | (2006.01) |
| ***H02P 7/025*** | (2016.01) |
| ***H04N 23/51*** | (2023.01) |

(52) U.S. Cl.
CPC ............. *H02K 11/33* (2016.01); *H02K 11/35* (2016.01); *H02K 41/0354* (2013.01); *H02P 7/025* (2016.02); *H04N 23/51* (2023.01)

(56) References Cited

U.S. PATENT DOCUMENTS

| | | | | |
|---|---|---|---|---|
| 10,750,062 | B2 | 8/2020 | Osaka et al. | |
| 10,880,461 | B2 | 12/2020 | Osaka et al. | |
| 10,986,274 | B2 | 4/2021 | Lee | |
| 11,287,603 | B2 | 3/2022 | Lim et al. | |
| 11,750,929 | B2 | 9/2023 | Sharma et al. | |
| 11,982,863 | B2 * | 5/2024 | Saito | H04N 23/57 |
| 2015/0350507 | A1 | 12/2015 | Topliss et al. | |
| 2017/0075129 | A1 | 3/2017 | Hsu et al. | |
| 2017/0317571 | A1 * | 11/2017 | Kim | H02K 41/0356 |
| 2017/0347017 | A1 * | 11/2017 | Ito | G02B 7/36 |
| 2018/0299651 | A1 * | 10/2018 | Yu | H02K 41/0354 |
| 2018/0356646 | A1 | 12/2018 | Hu | |
| 2020/0149877 | A1 | 5/2020 | Lee | |
| 2023/0010117 | A1 | 1/2023 | Sharma | |

FOREIGN PATENT DOCUMENTS

| | | | |
|---|---|---|---|
| JP | 2020-106552 | A | 7/2020 |
| JP | 2021-092819 | A | 6/2021 |
| KR | 10-2008-0068369 | A | 7/2008 |
| KR | 10-1779816 | B1 | 9/2017 |
| KR | 10-1792328 | B1 | 11/2017 |
| KR | 10-2018-0138145 | A | 12/2018 |
| KR | 10-2019-0001545 | A | 1/2019 |
| KR | 10-2017416 | B1 | 9/2019 |
| KR | 10-2020-0052063 | A | 5/2020 |
| KR | 10-2021-0044871 | A | 4/2021 |
| KR | 10-2305044 | B1 | 9/2021 |
| KR | 10-2021-0139030 | A | 11/2021 |
| KR | 10-2369432 | B1 | 3/2022 |

OTHER PUBLICATIONS

Extended European Search Report dated Apr. 29, 2025; European Appln. No. 23812213.91001 / 4468076 PCT/KR2023007311.
Indian Office Action dated Mar. 16, 2026, issued in Indian Application No. 202417063787.

* cited by examiner

810

CAMERA MODULE AND ELECTRONIC DEVICE HAVING SAME

CROSS-REFERENCE TO RELATED APPLICATION(S)

This application is a continuation application, claiming priority under § 365(c), of an International application No. PCT/KR2023/007311, filed on May 26, 2023, which is based on and claims the benefit of a Korean patent application number filed on May 27, 2022, in the Korean Intellectual Property Office, and of a Korean patent application number 10-2022-0113495, filed on Sep. 7, 2022, in the Korean Intellectual Property Office, the disclosure of each of which is incorporated by reference herein in its entirety.

TECHNICAL FIELD

The disclosure relates to a mobile electronic device that includes a camera module.

BACKGROUND ART

As functions of mobile electronic devices are diversified, there is an increasing demand for improving an image capturing function using the mobile electronic devices. Accordingly, an auto-focus (AF) function for adjusting the focus during image capturing is being developed.

A camera applied to a mobile electronic device may be located on at least one of a front surface and a rear surface and may operate to provide a function of taking pictures and/or capturing video images. For optical image stabilization (OIS) and auto-focus (AF) functions for a user at a time of capturing an image, a mobile electronic device may include an actuator configured to move at least a portion of an optical system or an image sensor to acquire clear photos and video images.

The above information is presented as background information only to assist with an understanding of the disclosure. No determination has been made, and no assertion is made, as to whether any of the above might be applicable as prior art with regard to the disclosure.

DISCLOSURE

Aspects of the disclosure are to address at least the above-mentioned problems and/or disadvantages and to provide at least the advantages described below. Accordingly, an aspect of the disclosure is to provide a mobile electronic device that includes a camera module.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a lens assembly comprising at least one lens aligned along an optical axis, and an AF actuator to move the lens assembly within the housing. The AF actuator may include a first AF magnet disposed on a first surface of the lens assembly, a second AF magnet disposed on a second surface facing a direction opposite to the first surface with respect to the lens assembly, a first AF coil disposed to face the first AF magnet, a first driving circuit including a first position sensor detecting a position of the first AF magnet and configured to control a current applied to the first AF coil, a second AF coil disposed to face the second AF magnet, and a second driving circuit including a second position sensor detecting a position of the second AF magnet and configured to control a current applied to the second AF coil. The first driving circuit may be configured to control the current applied to the first AF coil based on the position of the first AF magnet detected by the first position sensor and the position of the second AF magnet detected by the second position sensor to move the lens assembly based on a direction of the optical axis, and the second driving circuit may be configured to control the current applied to the second AF coil based on the position of the first AF magnet and the position of the second AF magnet to move the lens assembly based on the direction of the optical axis.

In accordance with another aspect of the disclosure, a camera module may include a housing, a lens assembly including at least one lens aligned along an optical axis, and an auto-focus (AF) driver to move the lens assembly within the housing. The AF actuator may include a first AF magnet disposed on a first side of the lens assembly, a second AF magnet disposed on a second side of the lens assembly opposite to the first side, a first AF coil disposed to face the first AF magnet, a first position sensor configured to detect a first position of the first AF magnet, a second AF coil disposed to face the second AF magnet, a second position sensor configured to detect a second position of the second AF magnet, and at least one driving circuit configured to control a current applied to the first AF coil based on the first position of the first AF magnet detected via the first position sensor and configured to control a current applied to the second AF coil based on the second position of the second AF magnet detected via the second position sensor to move the lens assembly in a direction of the optical axis.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Figure 1:
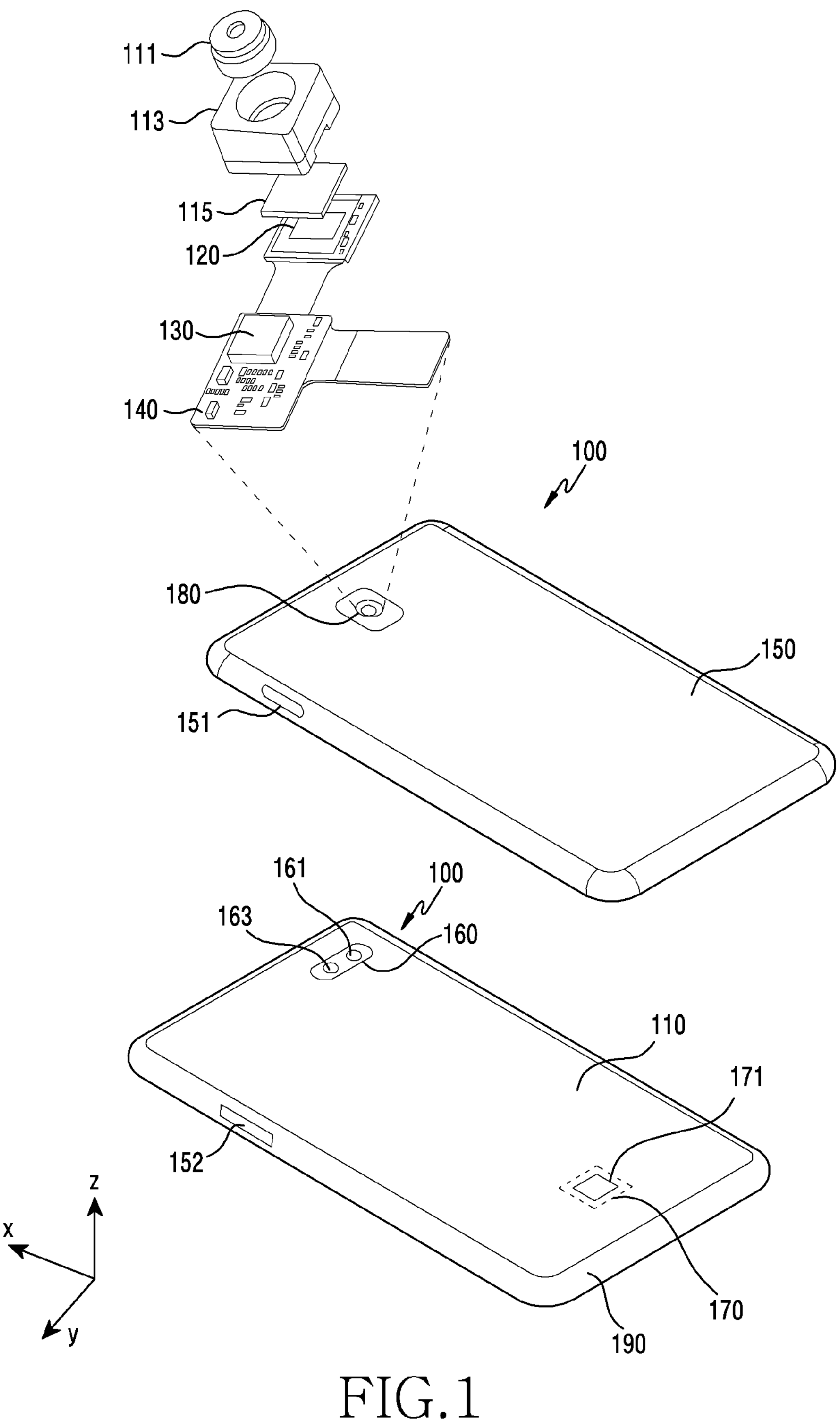
FIG. 1 is a view illustrating a structure of an electronic device and a camera module according to an embodiment of the disclosure.

FIG. 1 is a view illustrating a structure of an electronic device and a camera module according to an embodiment of the disclosure.

FIG. 1 is a view schematically illustrating the exterior of an electronic device 100 (e.g., the electronic device 1101 in FIG. 11) equipped with a camera module 180 (e.g., the camera module 1180 in FIG. 11) according to an embodiment, and the camera module 180. Although the embodiment of FIG. 1 is illustrated and described with reference to a mobile device, for example, a smartphone, it will be clearly understood by a person ordinarily skilled in the art that the embodiment is applicable to an electronic device equipped with a camera among various electronic devices or mobile devices.

Referring to FIG. 1, a display 110 may be disposed on the front surface of the electronic device 100 according to an embodiment. In an embodiment, the display 110 may occupy most of the front surface of the electronic device 100. The display 110 and a bezel 190 area surrounding at least some edges of the display 110 may be disposed on the front surface of the electronic device 100. The display 110 may include a flat area and a curved area extending from the flat area toward the side surface of the electronic device 100. The electronic device 100 illustrated in FIG. 1 is an example, and various embodiments are possible. For example, the display 110 of the electronic device 100 may include only a flat area without a curved area, or may include a curved area only at one edge rather than opposite edges. In an embodiment, the curved area may extend toward the rear surface of the electronic device, so the electronic device 100 may include an additional flat area.

In yet another embodiment, the electronic device 100 may additionally include at least one of a speaker, a receiver, a front camera, a proximity sensor, and a home key. The electronic device 100 according to an embodiment may be provided with a rear surface cover 150, which is integrated with the main body of the electronic device. In yet another embodiment, the rear surface cover 150 may be configured to be separable from the main body of the electronic device 100 to replace the battery. The rear surface cover 150 may be referred to as a battery cover or a back surface cover.

In yet another embodiment, a fingerprint sensor 171 configured to recognize a user’s fingerprint may be included in an area 170 of the display 110. The fingerprint sensor 171 may be disposed on a layer under the display 110 not to be visually recognized by a user or to be difficult to visually recognized by the user. In addition, a sensor for additional user authentication and/or biometric authentication may be disposed in a partial area of the display 110 in addition to the fingerprint sensor 171. In another embodiment, at least one of the sensor for user authentication or biometric authentication may be disposed in an area of the bezel 190. For example, an infrared (IR) sensor for iris authentication may be exposed through one area of the display 110 or through one area of the bezel 190.

In an embodiment, a front camera 161 may be disposed in an area 160 of the front surface of the electronic device 100. In the embodiment of FIG. 1, the front camera 161 is illustrated as being exposed through an area of the display 110, but the front camera 161 may be exposed through the bezel 190. In an embodiment, the display 110 may include, on the rear surface of the area 160, at least one of an audio module (e.g., an audio module 1170 in FIG. 11, a sensor module (e.g., the sensor module 1176 in FIG. 11 or a sensor 163), a camera module (e.g., the camera module 1180 of FIG. 11 or the front camera 161 of FIG. 1), and a light-emitting element (not illustrated). For example, a camera module may be disposed on the front surface and/or the side surface of the electronic device 100 to face the front and/or the side of the electronic device 100. For example, the front camera 161 may not be visually exposed to the area 160 and may include a hidden under display camera (UDC).

In an embodiment, the electronic device 100 may include one or more front cameras 161. For example, the electronic device 100 may include two front cameras such as a first front camera and a second front camera. In an embodiment, the first front camera and the second front camera may be cameras of the same type having the same specifications (e.g., pixels). In addition, the first front camera and the second front camera may be implemented as cameras having different specifications. The electronic device 100 may support dual camera-related functions (e.g., three-dimensional (3D) photography or auto-focus) with the two front cameras. The description of the above-mentioned front cameras may be equally or similarly applied to a rear camera of the electronic device 100.

In an embodiment, various types of hardware or sensors 163 that assist imaging, such as a flash, may be additionally disposed in the electronic device 100. For example, a distance sensor (e.g., a time-of-flight (TOF) sensor) configured to detect the distance between a subject and the electronic device 100 may be further included. The distance sensor may be applied to both the front camera and/or the rear camera. The distance sensor may be separately disposed, or may be included and disposed in the front camera and/or the rear camera.

In an embodiment, at least one physical key may be disposed on a side surface portion of the electronic device 100. For example, a first function key 151 configured to turn on/off the display 110 or turn ON/OFF the power source of the electronic device 100 may be disposed at the right edge with respect to the front surface of the electronic device 100. In an embodiment, a second function key 152 configured to control the volume or screen brightness of the electronic device 100 may be disposed at the left edge with respect to the front surface of the electronic device 100. Furthermore, an additional button or key may also be disposed on the front surface or the rear surface of the electronic device 100. For example, a physical button or a touch button mapped to a specific function may be disposed in a lower area of the front bezel 190.

The electronic device 100 illustrated in FIG. 1 corresponds to one example and does not limit the shape of the device to which the technical idea disclosed in the disclosure is applied. For example, the technical idea of the disclosure is also applicable to a foldable electronic device that is horizontally or vertically foldable by adopting a flexible display and a hinge structure, a rollable electronic device, or a tablet or a notebook computer. In addition, this technical idea is applicable when it is possible for the first camera and the second camera facing the same direction to be disposed to face different directions through at least one of rotation, folding, and transformation of the device.

Referring to FIG. 1, the electronic device 100 according to an embodiment may include a camera module 180. The camera module 180 (e.g., the camera module 1180 in FIG. 11) may include a lens assembly 111, a housing 113, an infrared cut filter 115, an image sensor 120, and an image signal processor 130.

In an embodiment, at least one of the number, arrangement, and type of lenses may vary depending on whether the lens assembly 111 is applied to a front camera or a rear camera. Depending on the types of lens assemblies, the front camera and the rear camera may have different characteristics (e.g., a focal length and a maximum magnification). The lenses may move forward and rearward along the optical axis (not illustrated) and may operate to change the focal length so that a target object, which is a subject, can be clearly captured.

According to an embodiment, light may travel from the front (e.g., the +z direction) to the rear (e.g., the −z direction) of the lens assembly 111. The light incident from the front of the lens assembly 111 to the frontmost lens of the lens assembly 111 may travel to the rear of the lens assembly 111 through multiple lenses.

In an embodiment, the camera module 180 may include a barrel in which one or more lenses aligned on the optical axis are disposed and a housing 113 in which one or more coils and/or magnets surrounding the periphery of the barrel about the optical axis are disposed. According to an embodiment, the housing 113 may include an opening in the central portion to expose a portion of the lens assembly 111. In an embodiment, the camera module 180 may perform a function of stabilizing an image (e.g., OIS) acquired by an image sensor 120 by using the one or more coils and/or magnets included in the housing 113. For example, the one or more coils may electromagnetically interact with each other under the control of a control circuit (e.g., the image signal processor 130 in FIG. 1 or the processor 1120 in FIG. 11). For example, the camera module 180 may be configured to control an electromagnetic force by controlling the direction and/or intensity of the current passing through the one or more coils under the control of the processor and may move (rotate) the lens assembly 111 and at least a portion of a carrier (e.g., an OIS carrier (not illustrated)) including the lens assembly 111 in a direction substantially perpendicular to the optical axis (not illustrated) by using a Lorentz force applied by the electromagnetic force or a solenoid-type actuator.

The camera module 180 may perform an auto-focus (e.g., AF) function in connection with an image acquired by the image sensor 120 by using the one or more coils and/or magnets included in the housing 113. For example, the one or more coils may electromagnetically interact with each other under the control of a control circuit (e.g., the image signal processor 130 in FIG. 1 or the processor 1120 in FIG. 11). For example, the camera module 180 may be configured to control an electromagnetic force by controlling the direction and/or intensity of the current passing through the one or more coils under the control of the processor and may move the lens assembly 111 and at least a portion of a carrier (e.g., the AF carrier 210 in FIG. 2) in the optical axis (not illustrated) by using a Lorentz force applied by the electromagnetic force or a solenoid-type actuator.

In an embodiment, the infrared cut filter 115 may be disposed on the top surface of the image sensor 120. For example, the infrared cut filter 115 may be disposed on a surface in a direction where the camera module 180 is exposed to the outside (e.g., the +z direction) among the surfaces of the image sensor 120. In an embodiment, an image of a subject passing through the lenses may be partially filtered by the infrared cut filter 115 and then detected by the image sensor 120.

In an embodiment, the image sensor 120 may be disposed on the top surface of a printed circuit board 140 (e.g., a printed circuit board (PCB), a printed board assembly (PBA), a flexible PCB (FPCB), or a rigid-flexible PCB (RFPCB)). According to an embodiment, the top surface may refer to a surface in a direction where the camera module 180 is exposed to the outside (e.g., the +z direction). The image sensor 120 may be electrically connected to the image signal processor 130 connected to the printed circuit board 140 by a connector. At least one of a flexible printed circuit board (FPCB) or a cable may be used as the connector.

In an embodiment, the image sensor 120 may be a complementary metal oxide semiconductor (CMOS) sensor or a charge-coupled device (CCD) sensor. Multiple individual pixels are integrated in the image sensor 120, and each individual pixel may include a micro lens, a color filter, and a photodiode. Each individual pixel is a kind of an optical detector that is capable of converting input light into an electrical signal. The optical detector may include a photodiode.

In an embodiment, the light information of a subject that is incident via the lens assembly 111 may be converted into an electrical signal by the image sensor 120, and the electrical signal may be input to the image signal processor 130.

In an embodiment, when the image signal processor 130 and the image sensor 120 are physically separated, a sensor interface conforming to an appropriate standard electrically connects the image sensor 120 and the image signal processor 130 to each other.

In an embodiment, the camera module 180 may be disposed on the front surface as well as the rear surface of the electronic device 100. In addition, in order to improve camera performance, the electronic device 100 may include not only a single camera module 180, but also multiple camera modules 180. For example, the electronic device 100 may further include a front camera 161 for a video call or selfie photographing. The front camera 161 may support a relatively low number of pixels compared to the rear camera module. The front camera may be relatively smaller than the rear camera module, but there is no limitation.

Figure 2:
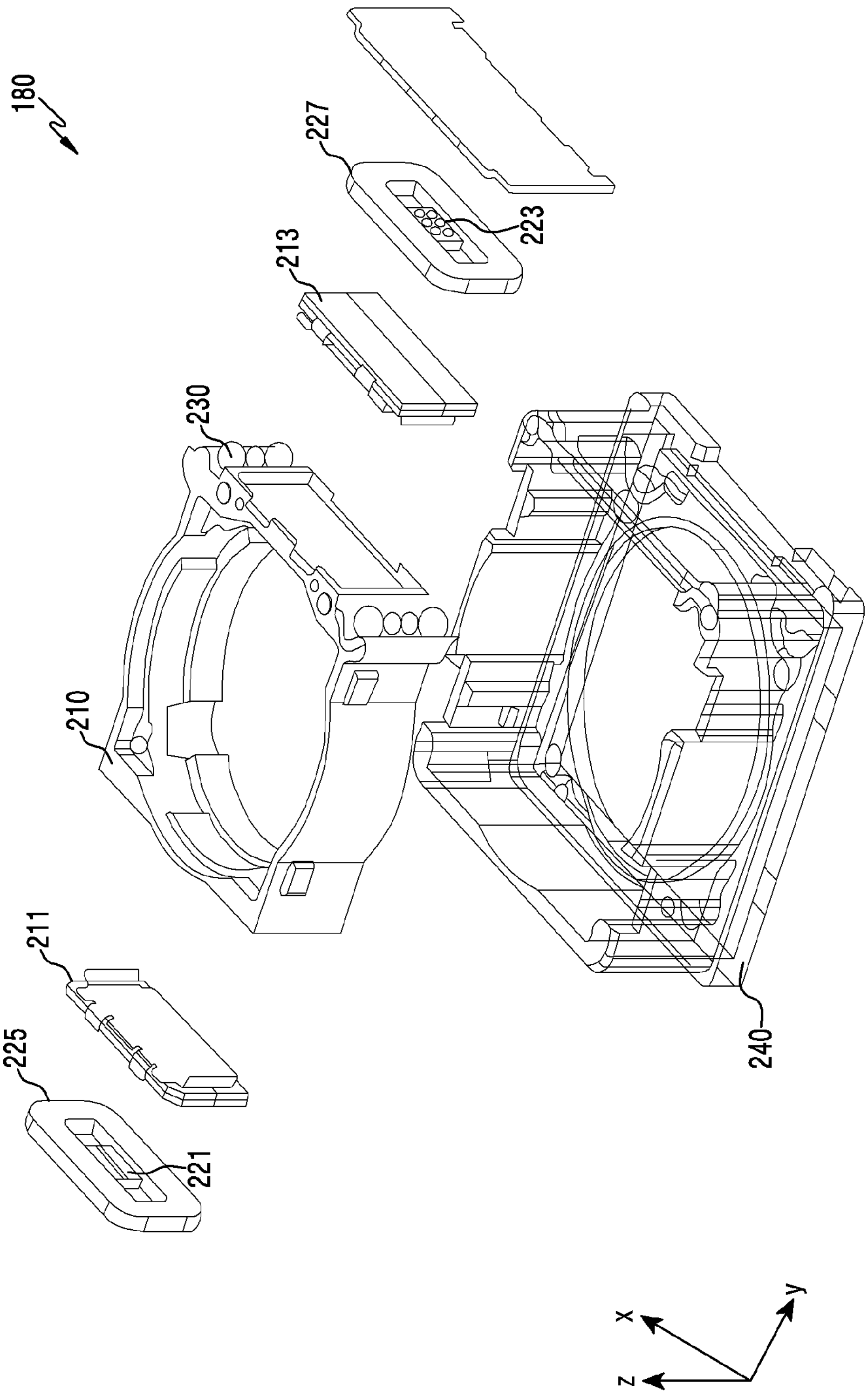
FIG. 2 is an exploded perspective view of an AF actuator of a camera module according to an embodiment of the disclosure.

In an embodiment, the camera module 180 may include a first housing (e.g., the housing 113 of FIG. 1), a second housing (e.g., the second housing 240 of FIG. 2) coupled to the first housing to define a space, a lens assembly 111, and an auto-focus (AF) carrier (e.g., the AF carrier 210 of FIG. 2). The first housing may be referred to or called as a shield can. The second housing may be referred to or called as a base. Components of the camera module 180 may be accommodated in the space defined between the first housing and the second housing. According to an embodiment, the camera module 180 is not limited to the above-listed configurations and may include various configurations. For example, the camera module 180 may include a stopper accommodated in the second housing, a lens barrel, and an OIS carrier.

According to an embodiment, the stopper may limit the movement range of the lens assembly 111. For example, the stopper may restrict the movement of the lens assembly 111 moving in the optical axis direction (e.g., the +z/−z-axis direction) according to AF driving.

In an embodiment, the electronic device 100 may drive the OIS carrier for a hand shake correction function (e.g., an optical image stabilization function). For example, the electronic device 100 may correct camera shaking by moving the OIS carrier in a direction substantially perpendicular to the optical axis direction (e.g., the +x/−x direction or the +y/−y direction).

In an embodiment, the electronic device 100 may drive the AF carrier for a focus control function (e.g., an auto-focus function). For example, the electronic device 100 may adjust the focal length of the camera by moving the AF carrier in the optical axis direction (e.g., the +z/−z direction).

According to an embodiment, the camera module 180 may be designed to have a structure in which the lenses are integrally moved when driving the OIS and the AF. For example, the ball guide may be disposed on the AF carrier, the OIS carrier may be disposed on the ball guide, and the lenses may be disposed on the OIS carrier. As the AF carrier and the OIS carrier move, the lenses may integrally perform AF and OIS.

According to an embodiment, in order to move the lens barrel along the optical axis direction without tilting in order to satisfy high pixelation and miniaturization, instead of the type that supports the lens barrel with an elastic member, a ball-driven rolling support method or a shaft-driven support method is applied to the camera module 180. For example, in order to move the lens barrel forward or rearward in the optical axis direction, the lens barrel may be slidably installed on a shaft extending in the optical axis direction inside the housing. Alternatively, the lens barrel may be installed such that while friction is reduced by using a ball between the inner portion of the housing and the lens barrel, the lens barrel is slid in response to the rolling of the ball.

FIG. 2 is an exploded perspective view of an AF actuator of a camera module 180 according to an embodiment of the disclosure.

Figure 3:
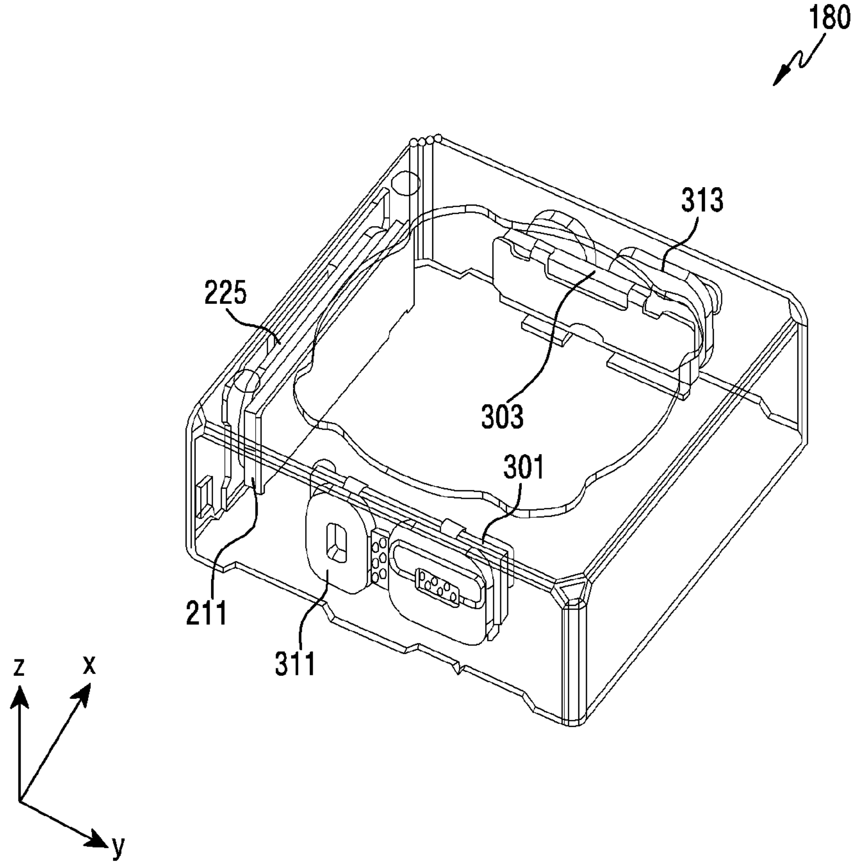
FIG. 3 is a view illustrating a camera module including an OIS driver and an AF actuator driven in a Lorentz type and a solenoid type according to an embodiment of the disclosure.

FIG. 3 is a view illustrating a camera module including an OIS driver and an AF actuator driven in a Lorentz type and a solenoid type according to an embodiment of the disclosure.

In the description to be made with reference to FIGS. 2 and 3, the configuration described with reference to FIG. 1 may be briefly described or omitted.

Referring to FIGS. 2 and 3, the camera module 180 may include an AF actuator to implement a focus control function (e.g., an auto-focus function). According to an embodiment, the AF actuator may include magnets (e.g., a first magnet 211 and a second magnet 213), coils (e.g., the first coil 225 and the second coil 227), and/or AF balls 230 in a space defined between a first housing (e.g., the first housing 113) and a second housing 240. One of magnets (e.g., a first magnet 211 and a second magnet 213) or coils (e.g., the first coil 225 and the second coil 227) may be attached to an AF carrier 210. However, the position of magnets (e.g., a first magnet 211 and a second magnet 213) or coils (e.g., the first coil 225 and the second coil 227) is not limited to the above-described position. According to an embodiment, the AF actuator is not limited to the examples listed above and may include various components for executing a focus control function. For example, the AF actuator may include at least one position sensor configured to detect the position of the magnets and/or at least one driving circuit configured to control a current applied to the coils based on the position of the magnets detected via the at least one position sensor.

In an embodiment, the AF carrier 210 may be installed to be movable within the second housing 240. The AF carrier 210 may move in one dimension (e.g., in a one-axis direction). For example, the electronic device 100 may move the AF carrier 210 to prevent image quality from being deteriorated due to defocus. For example, the electronic device 100 may adjust the focal length of the camera by moving the AF carrier 210 in the optical axis direction (e.g., the +z/−z direction). For example, the electronic device 100 may execute AF control by moving the lens barrel up and down by moving the AF carrier 210 in the optical axis direction (e.g., the +z/−z direction).

In an embodiment, the AF actuator may include not only a first magnet 211 attached to a portion thereof but also a second magnet 213. For example, the AF carrier 210 may include a first magnet 211 attached to a portion thereof and a second magnet 213 disposed on a surface facing the first magnet 211. According to an embodiment, the first magnet 211 may be disposed on a first side (e.g., a first side surface) of the AF carrier 210 facing a first direction (e.g., the −y direction) to face the first coil 225. The second magnet 213 may be disposed on a second side (e.g., a second side surface) of the AF carrier 210 facing a second direction (e.g., the +y direction) to face the second coil 227. The first magnet 211 may move in a third axis direction (e.g., the +z/−z direction) by a magnetic force generated through interaction with the first coil 225. In addition, the second magnet 213 may move in the third axis direction (e.g., the +z/−z direction) like the third magnet 301 by the magnetic force generated through interaction with the second coil 227. Accordingly, the AF carrier 210 may be driven by the Lorentz force between the first magnet 211 and the first coil 225 in the third axial direction (e.g., the +z/−z direction) and the Lorentz force between the second magnet 213 and the second coil 227. In an embodiment, the movement of the AF carrier 210 may be guided by the AF balls 230. As the AF carrier 210 is driven, the lens assembly 111 moves to adjust the path of light to the image sensor 120 so that a focus control (AF) function can be executed. For example, the AF carrier 210, which includes the first magnet 211 and the second magnet 213 disposed at positions facing each other, may prevent inclination and/or distortion (e.g., tilt) of the lens assembly 111 by separately controlling each of the first coil 225 and the second coil 227. The separately controlling of the first coil 225 and the second coil 227 will be described below with reference to FIGS. 4, 5, and 6.

In an embodiment, at least one printed circuit board (not illustrated) may be electrically connected to at least one portion of the AF carrier 210. According to an embodiment, at the time of photographing by the camera, at least one processor (e.g., the processor 1120 in FIG. 11) included in the electronic device 100 may generate an AF control value to adjust the focal length between the subject and the camera, and the electronic device 100 may implement the AF by transmitting an electrical signal corresponding to the AF control value to the AF driving coils (e.g., the first coil 225 and the second coil 227).

According to an embodiment, in order to correct inclination and/or distortion of the lens assembly 111, at least one processor (e.g., the processor 1120 of FIG. 11) included in the electronic device 100 may transmit an electrical signal corresponding to a calibration value to the AF driving coils (e.g., the first coil 225 and the second coil 227) based on the calibration value stored in a memory (e.g., the memory 440 of FIG. 4 or the memory 1130 in FIG. 11), thereby correcting the distortion. For example, the at least one processor may determine a value controlling the current applied to the first coil 225 based on a first calibration value stored in the memory. The at least one processor may determine a value controlling the current applied to the second coil 227 based on a second calibration value stored in the memory. According to an embodiment, the electronic device 100 may compensate for distortion due to AF driving by including separate control circuits for the first coil 225 and the second coil 227 to control of the first coil 225 and the second coil 227, respectively.

In an embodiment, a driver integrated circuit (IC) may be included in one or more driving coils (e.g., the first coil 225 and the second coil 227). The driver IC may be disposed in the at least one drive coil. In one example, the driver IC may be disposed in the center of the at least one drive coil. However, the disclosure is not be limited thereto. According to an embodiment, the AF actuator may include at least one position sensor (e.g., a first position sensor and/or a second position sensor). For example, the driver IC may include a Hall sensor. For example, the position sensor may include a position sensor. However, the disclosure is not limited thereto. For example, the position sensor may comprise at least one of a TMR sensor, an AMR sensor, or a GMR sensor. For example, the first driver IC 221 at the center of the first coil 225 may include a first position sensor. A second driver IC 223 at the center of the second coil 227 may include a second position sensor. Accordingly, the first position sensor may be disposed at the center of the first coil 225, and the second position sensor may be disposed at the center of the second coil 227. In an example, the first position sensor may be configured to detect the first position of the first AF magnet. In an example, the second position sensor may be configured to detect the second position of the second AF magnet.

According to an embodiment, at least one driving circuit (e.g., the at least one driver IC) may be configured to control a current applied to the first AF coil based on the first position of the first AF magnet detected via the first position sensor, and configured to control a current applied to the second AF coil based on the second position of the second AF magnet detected via the second position sensor to move the lens assembly in a direction of the optical axis. However, the disclosure is not limited to this. For example, the at least one driving circuit may be configured to control the current applied to the first AF coil based on the first position and the second position, and configured to control the current applied to the second AF coil based on the first position and the second position. For example, the at least one driving circuit may be configured to control at least one of the current applied to the first AF coil or the current applied to the second AF coil to compensate for a tilt of the lens assembly based on at least one of the first position or the second position.

According to an embodiment, the at least one circuit is configured to control the current applied to the first AF coil based on a position of the second AF magnet with respect to the second position sensor, wherein the position is acquired by using the second position sensor, and the at least one circuit is configured to control the current applied to the second AF coil based on a position of the first AF magnet with respect to the first position sensor, wherein the position is acquired by using the first position sensor.

According to an embodiment, the at least one driving circuit (e.g., the at least one driver IC) may include a first driving circuit (e.g., the first driver IC) configured to control the current applied to the first AF coil based on at least one of the first position or the second position and a second driving circuit (e.g., the second driver IC) configured to control the current applied to the second AF coil based on at least one of the first position or the second position.

In an embodiment, the at least one position sensor (e.g., the first position sensor and the second position sensor) may detect the displacement of the at least one carrier based on the position of a magnet (e.g., the first magnet 211 or the second magnet 213) moving with the AF carrier 210. Through interaction with a magnet facing the at least one position sensor, the at least one position sensor may measure the position of the magnet facing the position sensor with respect to the position sensor. The at least one position sensor may detect the position of the magnet facing the at least one position sensor by measuring a change in a magnetic field formed by the magnet facing the at least one position sensor. For example, the first position sensor may be included in the first driver IC 221 at the center of the first coil 225 and configured to measure the position of the first magnet 211 in the third axis (e.g., the z-axis) direction with respect to the first position sensor of the first magnet 211. The second position sensor may be included in the second driver IC 223 at the center of the second coil 227 and configured to measure the position of the second magnet 213 in the third axis (e.g., the z-axis) direction with respect to the second position sensor of the second magnet 213. In an embodiment, in performing the AF function, the electronic device 100 may compensate for distortion and/or inclination (e.g., tilt) occurring during AF driving by controlling the first coil 225 and the second coil 227 by the first driver IC 221 and the second driver IC 223, respectively. For example, the electronic device 100 may control the current applied to each of the first coil 225 and the second coil 227 by measuring, by the first position sensor, the position in the third axis (e.g., the z-axis) direction with respect to the first position sensor and measuring, by the second position sensor, the position in the third axis (e.g., the z-axis) direction with respect to the second position sensor. For example, the first driver IC 221 may control the current applied to the first coil 225 based on a position of the second magnet 213 relative to the second position sensor obtained using the second position sensor, and the second driver IC 223 may control the current applied to the second AF coil based on a position of the first magnet 211 relative to the first position sensor obtained using the first position sensor. For example, the first driver IC 221 may control the current applied to the first coil 225 based on a position relative to the first position sensor of the first magnet 211 obtained using the first position sensor, and the second driver IC 223 may control the current applied to the second coil 227 based on a position relative to the second position sensor of the second magnet 213 obtained using the second position sensor. For example, the first driver IC 221 may control the current applied to the first coil 225 based on the first position and the second position. For example, the second driver IC 223 may control the current applied to the second coil 227 based on the first position and the second position.

According to one embodiment, the first driver IC 221 may be to apply the current to the first coil 225 such that the lens assembly (e.g., the lens assembly 111 of FIG. 1) is moved based on the position of the first magnet 211 and the position of the second magnet 213 in the direction of the optical axis. The second driver IC 223 may be to apply the current to the second coil 227 such that the lens assembly (e.g., the lens assembly 111 of FIG. 1) is moved based on the direction of the optical axis based on the position of the first magnet 211 and the position of the second magnet 213. Accordingly, the electronic device 100 may compensate for distortion and/or inclination (e.g., tilt) occurring during AF driving by controlling each of the opposite ends of the AF carrier 210.

According to an embodiment, the electronic device 100 may include an AF driver IC connected with the at least one driver IC. For example. the first driver IC 221 and the second driver IC 223 may be configured as a single AF driver IC. In an example, the single AF driver IC may control the at least one driver IC respectively. For example, the single AF driver IC may be connected with the first driver IC 221 and the second driver IC 223, and the single AF driver IC may be configured to control the first driver IC 221 and the second driver IC 223, respectively. According to an embodiment, in the camera module 180, control circuits connected respectively to the first coil 225 and the second coil 227 may be configured separately, and the driver ICs controlling respective control circuits may be configured as an AF driver IC. For example, the first driver IC 221 may be connected with a first controller, and the second driver IC 223 may be connected with a second controller. The first controller may be configured to control the first driver IC 221, and the second controller may be configured to control the second driver IC 223.

In an embodiment, two or more position sensors (e.g., the first position sensor and the second position sensor) may be included inside two or more coils (e.g., the first coil 225 and the second coil 227), respectively. The position sensors included in the coils may be referred to as built-in position sensors.

According to an embodiment, the camera module 180 may include another sensor configured to detect the movement (rotation) (e.g., positions in the x-axis, y-axis, and z-axis directions) of at least one magnetic body (or magnet) (e.g., the first magnet 211 or the second magnet 213). For example, the camera module 180 may include a tunnel magneto-resistance sensor (TMR) sensor and may detect the movement (rotation) of at least one magnet by using a resistance value that changes based on the relative angles of multiple magnets of the TMR sensor. According to an embodiment, the camera module 180 may detect the movement (rotation) of at least one magnet by using an anisotropic magneto-resistance (AMR) sensor or a giant magneto-resistance (GMR) sensor.

The magnets (e.g., the first magnet 211 and/or the second magnet 213) and the coils (e.g., the first coil 225 and/or the second coil 227) of the camera module 180 according to an embodiment are not limited to the arrangement illustrated in FIGS. 2 and 3.

According to an embodiment, FIG. 3 may be a view illustrating the OIS driver and the AF actuator in which the AF actuator of FIG. 2 is partially omitted.

Referring to FIG. 3, in various embodiments, the camera module 180 may include the OIS driver described with reference to FIG. 1 for a hand shake correction function. According to an embodiment, the OIS driver may include a third coil 311 and a fourth coil 313. In an embodiment, one of the third coil 311 and the fourth coil 313 may be configured to be driven by a corresponding magnet (e.g., the third magnet 301 and/or the fourth magnet 303) in a solenoid type, and the other may be configured to be driven in a Lorentz type.

According to an embodiment, the OIS of the camera module 180 may be driven in a Lorentz-solenoid type. For example, the third magnet 301 may be disposed to face the third coil 311, and the fourth magnet 303 may be disposed to face the fourth coil 313. According to an embodiment, the image sensor 120 described with reference to FIG. 1 may move in response to the driving of the OIS driver to execute an optical image stabilization function (e.g., OIS).

In an embodiment, the above-described structures may also be applied to a curved camera module 180 including a prism. According to an embodiment, the prism may be disposed to refract a path of light passing through the lens assembly toward the image sensor, or disposed to refract a path of light to be incident to the lens assembly.

According to an embodiment, the curved camera module 180 may include an optical system including a lens assembly 111 and a prism (not illustrated). The curved camera module 180 according to an embodiment may include a refractive optical system in which a light path extending from a subject to the image sensor 120 via the lens assembly 111 and the prism (not illustrated) is refracted one or more times. The curved camera module 180 according to an embodiment may be provided with at least one magnet (e.g., a first magnet 211, a second magnet 213, a third magnet 301, and/or a fourth magnet 303) according to the moving direction of the light and/or at least one coil (e.g., the first coil 225, the second coil 227, the third coil 311, and/or the fourth coil 313).

Figure 4:
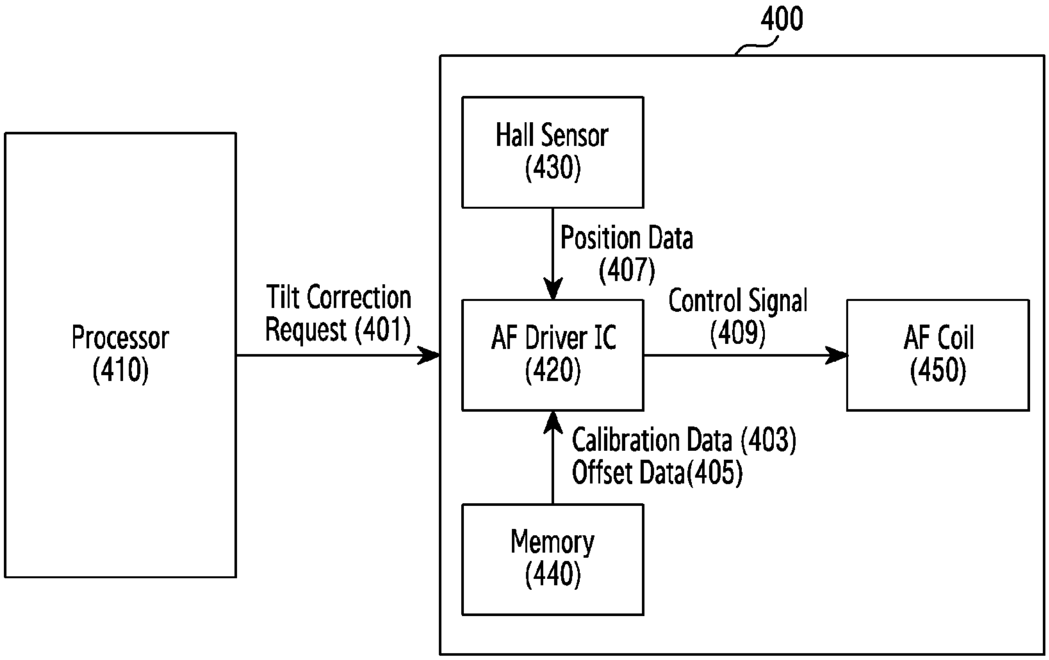
FIG. 4 is a view for explaining an operation of controlling an AF actuator based on a calibration value according to an embodiment of the disclosure.

FIG. 4 is a view for explaining an operation of controlling an AF actuator based on a calibration value according to an embodiment of the disclosure.

Referring to FIG. 4, an image actuator 400 including the AF actuator described with reference to FIGS. 2 and 3 is illustrated. The image actuator 400 of the disclosure may include all components required to provide a focus control function of a camera module (e.g., the camera module 180 of FIG. 1). According to an embodiment, the AF actuator (e.g., the AF actuator described with reference to FIGS. 2 and 3) may include all components for moving a lens assembly (e.g., the lens assembly 111 of FIG. 1) to provide a focus control function of the camera module 180. According to an embodiment, an AF carrier (e.g., the AF carrier 210 of FIG. 2) is connected to the lens assembly 111 to move one component of the AF actuator moving in the optical axis direction to move the lens assembly in the optical axis direction.

Referring to FIG. 4, a processor 410 (e.g., the processor 1120 of FIG. 11) may be connected to the image actuator 400 to control a focus control function of the camera module 180. According to an embodiment, the processor 410 may transmit a tilt correction request 401 to the image actuator 400 in order to reduce distortion and/or inclination (e.g., tilt) of the lens assembly included in the image actuator 400. For example, the processor 410 may control the AF actuator based on a camera calibration value when power is applied.

According to an embodiment, an AF driver IC 420 (e.g., the first driver IC 221 and/or the second driver IC 223 of FIG. 2) may acquire calibration data 403 from a memory 440 (e.g., the memory 1130 of FIG. 11) in response to the tilt correction request 401. The calibration data 403 may include a first calibration value and a second calibration value. According to an embodiment, the calibration data 403 may include values stored in the memory 440 and/or the memory of the AF driver IC 420. According to an embodiment, the calibration data 403 may be acquired by executing an operation to be described later with reference to FIG. 9. For example, the calibration data 403 may include a value determined through a stroke adjustment process.

According to an embodiment, the AF driver IC 420 may acquire offset data 405 for additionally correcting distortion and/or inclination of the lens assembly via the memory 440. According to an embodiment, the offset data 405 may include values stored in the memory 440 and/or the memory of the AF driver IC 420. According to an embodiment, the offset data 405 may be acquired by executing an operation to be described later with reference to FIG. 10. For example, the offset data 405 may include data for compensating for inclination and/or distortion occurring in an additional process for the camera module 180.

According to an embodiment, the at least one AF driver IC 420 may map a position corresponding to the calibration data 403. For example, the AF driver IC 420 may map a first calibration position, which is the height of a first AF magnet (e.g., the first magnet 211 in FIG. 2) from a reference position (e.g., the center of the range of moving of the first AF magnet within the second housing 240 or a location adjacent to the base portion of the second housing 240), the height being determined based on a first calibration value. For example, the AF driver IC 420 may map a second calibration position, which is the height of a second AF magnet (e.g., the second magnet 213) from the reference position (e.g., the center of the range of moving of the first AF magnet within the second housing 240), the height being determined based on a second calibration value. The reference position may mean a position when the stroke value has a value of zero. The base portion of the second housing 240 may mean a portion (e.g., a plate or face) of the second housing 240 oriented toward the −Z axis, or a plate or face substantially perpendicular to the direction of the optical axis.

According to an embodiment, the at least one processor may be configured to determine a first calibration position by mapping a height of the first AF magnet (e.g., the first magnet 211) from a reference position based on the first calibration value, and determine a second calibration position by mapping a height of the second AF magnet (e.g., the second magnet 213) from the housing based on the second calibration value.

According to an embodiment, the at least one AF driver IC 420 may be configured to control the current applied to the first AF coil based on a comparison of the first calibration position and a first current position measured via the first position sensor, and control the current applied to the second AF coil based on a comparison of the second calibration position and a second current position measured via the second position sensor.

According to an embodiment, as the AF function is executed, the position sensor 430 may detect positions of the first AF magnet and the second AF magnet. According to an embodiment, the position sensor 430 may include a first AF position sensor corresponding to the first AF magnet and a second AF position sensor corresponding to the second AF magnet. In an embodiment, the first AF position sensor and the second AF position sensor may detect a first position of the first AF magnet and a second position of the second AF magnet. For example, the first AF position sensor may detect a first position indicating the current position of the first AF magnet from a reference position (e.g., the center of the range of moving of the first AF magnet within the second housing 240 or a location adjacent to the base portion of the second housing 240). For example, the second AF position sensor may detect a second position indicating the current position of the second AF magnet from a reference position (e.g., the center of the range of moving of the first AF magnet within the second housing 240 or a location adjacent to the base portion of the second housing 240). The AF Hall sensor may be referred to as a Hall sensor in this disclosure.

According to an embodiment, the position sensor 430 may generate position data 407 including information about the first position and the second position. In an embodiment, the AF driver IC 420 may acquire position data 407 from the position sensor 430.

According to an embodiment, the AF driver IC 420 may determine whether the first position and the first calibration position are the same or have a difference less than a threshold value therebetween. In addition, the AF driver IC 420 may determine whether the second position and the second calibration position are the same or have a difference less than a threshold value therebetween. In an embodiment, a difference of less than the threshold value may be determined to be substantially the same.

According to an embodiment, the AF driver IC 420 may determine whether the first calibration position, which is a position for compensating for tilt, is the same as the first position. In addition, the AF driver IC 420 may determine whether the second calibration position, which is a position for compensating for tilt, is the same as the second position.

According to an embodiment, when the first position and the first calibration position are not the same or when the second position and the second calibration position are not the same, the AF driver IC 420 may adjust the positions of the first AF magnet and the second AF magnet. According to an embodiment, when the first position and the first calibration position have a difference equal to greater than the threshold value therebetween or when the second position and the second calibration position have a difference equal to or greater than the threshold value therebetween, the AF driver IC 420 may adjust the positions of the first AF magnet and the second AF magnet.

In an embodiment, the AF driver IC 420 may adjust the positions of the first AF magnet and the second AF magnet in consideration of the offset data 405.

According to an embodiment, the AF driver IC 420 may transmit a control signal 409 to the AF coil 450 to adjust the positions of the first AF magnet and the second AF magnet.

In an embodiment, the AF coil 450 may include a first AF coil (e.g., the first coil 225 of FIG. 2) and a second AF coil (e.g., the second coil 227 of FIG. 2).

According to an embodiment, the AF driver IC 420 may control the power applied to the first AF coil and the second AF coil by transmitting the control signal 409 to the AF coil 450 such that the first AF magnet and the second AF magnet can be located at the first calibration position and the second calibration position, which are positions for compensating for tilt.

According to an embodiment, the electronic device 100 may terminate the operation for correcting the tilt when the first position and the first calibration position are the same or have a difference less than the threshold value therebetween and the second position and the second calibration position are the same or have a difference less than the threshold value therebetween.

According to an embodiment, an operation of the AF driver IC 420 may be executed by the processor 410.

Figure 5:
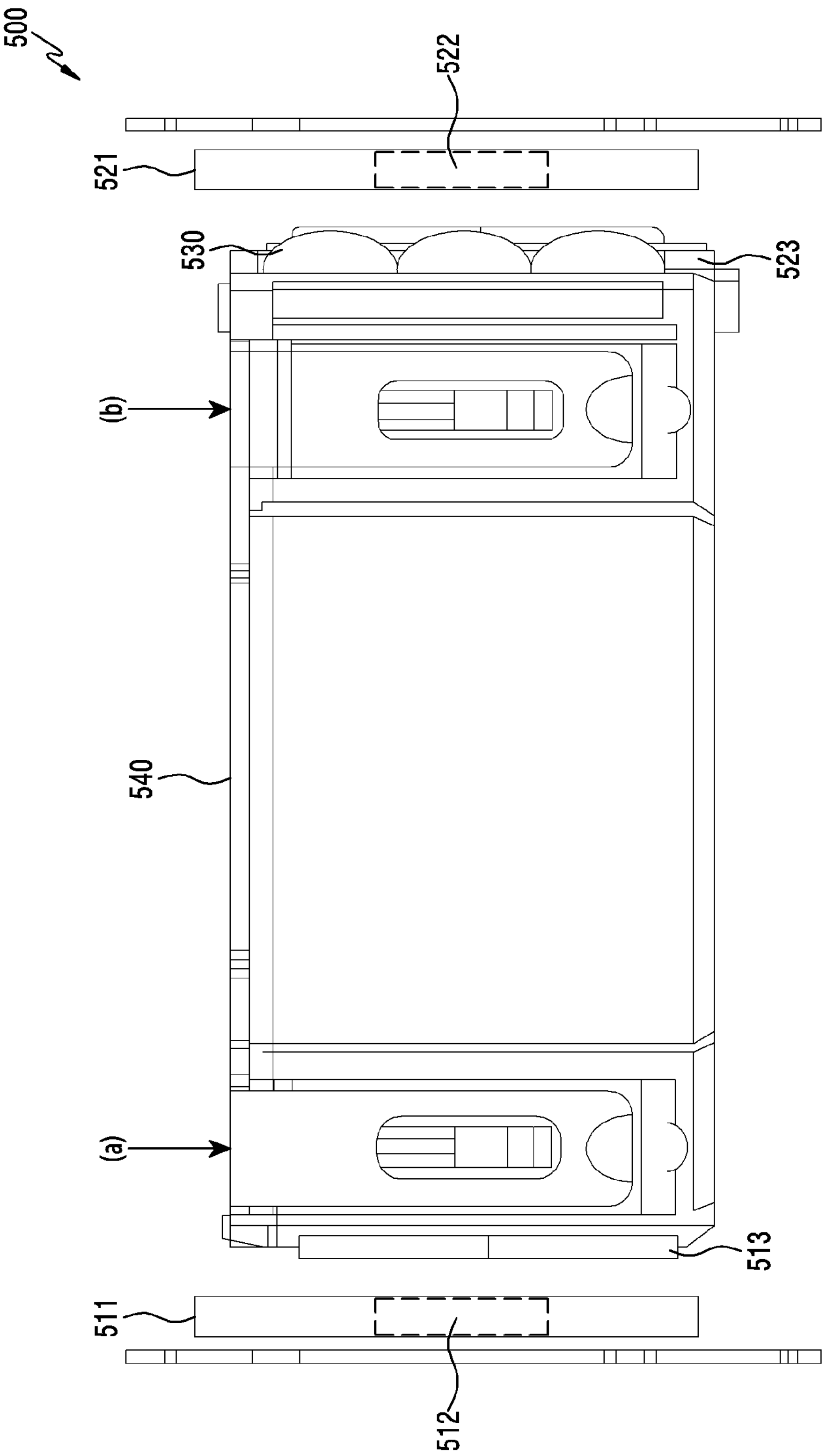
FIG. 5 illustrates a ball-type AF actuator according to an embodiment of the disclosure.

FIG. 5 illustrates a ball-type first AF actuator 500 according to an embodiment of the disclosure.

Figure 6:
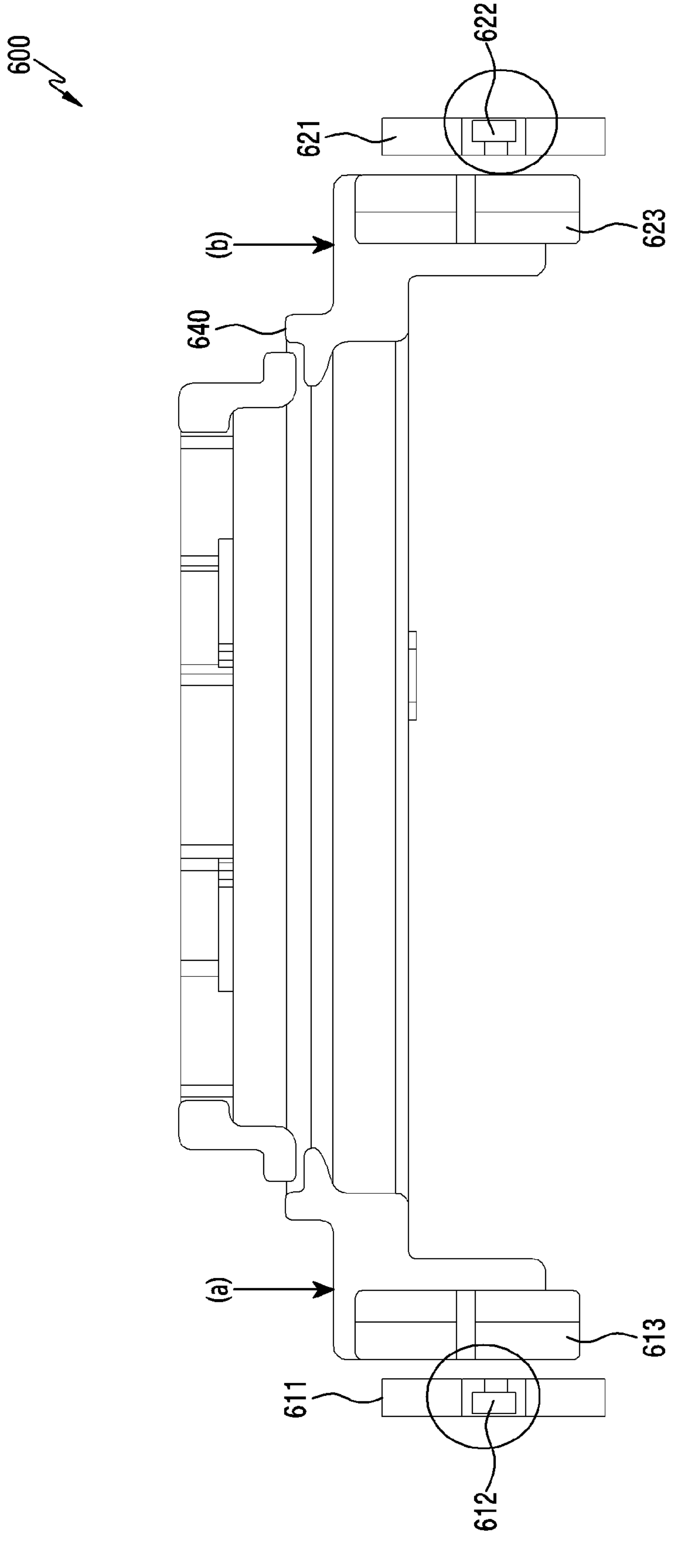
FIG. 6 illustrates a shaft-type AF actuator according to an embodiment of the disclosure.

FIG. 6 illustrates a shaft-type second AF actuator 600 according to an embodiment of the disclosure.

Referring to FIGS. 5 and 6, some of multiple components included in an AF actuator (e.g., a first AF actuator 500 and/or a second AF actuator 600) are illustrated. At this time, some of descriptions of the same components as those described with reference to FIGS. 1 to 4 may be omitted. FIGS. 5 and 6 illustrate a direct-type optical system in which light passing through an optical axis of lenses from a subject directly enters an image sensor (e.g., the image sensor 120 of FIG. 1) without being refracted.

Referring to FIG. 5, a camera module (e.g., the camera module 180 of FIG. 1) may include a first AF actuator 500 configured to execute an AF function. In an embodiment, the first AF actuator 500 may include an AF carrier 540 (e.g., the AF carrier 210 of FIG. 2), a first AF driver IC 512 (e.g., the first driver IC 221 of FIG. 2), a second AF driver IC 522 (e.g., the second driver IC 223 of FIG. 2), a first AF magnet 513 (e.g., the first magnet 211 of FIG. 2), a second AF magnet 523 (e.g., the second magnet 213 of FIG. 2), a first AF coil 511 (e.g., the first coil 225 of FIG. 2), and a second AF coil 521 (e.g., the second coil 227 of FIG. 2). As the first AF driver IC 512 and the second AF driver IC 522 are disposed at the opposite ends of the AF actuator according to an embodiment, respectively, the AF actuator may control each of opposite ends of the first AF actuator 500.

For example, the first AF actuator 500 of the camera module 180 may control the current applied to the first AF coil 511 via the first AF driver IC 512. According to an embodiment, as the current is applied to the first AF coil 511, the AF actuator may move in the optical axis direction by a magnetic force generated between the first AF magnet 513 and the first AF coil 511. In addition, the AF actuator of the camera module 180 may execute control such that the current applied to the second AF coil 521 via the second AF driver IC 522 is different from the current applied to the first AF coil 511. According to an embodiment, as the current is applied to the second AF coil 521, the first AF actuator 500 moves in the optical axis direction by the magnetic force generated between the second AF magnet 523 and the second AF coil 521.

According to an embodiment, the first AF driver IC 512 and the second AF driver IC 522 may control the magnitudes of the currents applied to the first AF coil 511 and the second AF coil 521 based on the calibration values stored in the memory (e.g., the memory 440 in FIG. 4 or the memory 1130 in FIG. 11) of the electronic device 100. For example, the first AF driver IC 512 and the second AF driver IC 522 may control the AF driving by using calibration values that allow the opposite ends of the first AF actuator 500 to have substantially the same stroke. According to an embodiment, the calibration values may include a value determined by applying the same stroke adjustment process to the opposite ends of the first AF actuator 500 in a process operation of the electronic device 100. An embodiment of configuring calibration values according to an embodiment will be described later with reference to FIG. 9.

According to an embodiment, each of the first AF driver IC 512 and the second AF driver IC 522 may include a built-in position sensor. For example, the first AF driver IC 512 may include a first AF position sensor (e.g., the third position sensor described with reference to FIGS. 2 and 3). For example, the second AF driver IC 522 may include a second AF position sensor (e.g., the fourth position sensor described with reference to FIGS. 2 and 3).

According to an embodiment, at least one position sensor may detect displacement of at least one carrier based on the position of a magnet moving together with at least one carrier. According to an embodiment, the first AF position sensor may measure the position of the first AF magnet 513 facing the first AF position sensor with respect to the first AF position sensor through interaction with the first AF magnet 513 facing the first AF position sensor. For example, the first AF position sensor detects the position of the first AF magnet 513 facing the first AF position sensor by measuring a change in a magnetic field formed by the first AF magnet 513 facing the first AF position sensor. Therefore, the first AF position sensor may be built in the first AF driver IC 512 at the center of the first AF coil 511 and may be configured to measure the position of the first AF magnet 513 with respect to the first AF position sensor in the optical axis direction. According to an embodiment, the first AF driver IC 512 may detect the displacement of the AF carrier 540 in the optical axis direction measured via the first AF position sensor and may control the current applied to the first AF coil 511 based on a calibration value stored in the memory (e.g., the memory 440 of FIG. 4 or the memory 1130 of FIG. 11). For example, the first AF driver IC 512 may adjust the current applied to the first AF coil 511 to control the AF carrier 540 to be located at a position determined based on the calibration value. Accordingly, the first AF driver IC 512 may control the displacement of a first end (a) of the AF carrier 540 in the optical axis direction.

According to an embodiment, the second AF position sensor may measure the position of the second AF magnet 523 facing the second AF position sensor with respect to the second AF position sensor through interaction with the second AF magnet 523 facing the second AF position sensor. For example, the second AF position sensor may detect the position of the second AF magnet 523 facing the second AF position sensor by measuring a change in a magnetic field formed by the second AF magnet 523 facing the second AF position sensor. Therefore, the second AF position sensor may be built in the second AF driver IC 522 at the center of the second AF coil 521 and may be configured to measure the position of the second AF magnet 523 with respect to the second AF position sensor in the optical axis direction. According to an embodiment, the second AF driver IC 522 may detect the displacement of the AF carrier 540 in the optical axis direction measured via the second AF position sensor and may control the current applied to the second AF coil 521 based on a calibration value stored in the memory (e.g., the memory 440 of FIG. 4 or the memory 1130 of FIG.

11). For example, the second AF driver IC 522 may adjust the current applied to the second AF coil 521 to control the AF carrier 540 to be located at a position determined based on the calibration value. Accordingly, the second AF driver IC 522 may control the displacement of a second end (b) of the AF carrier 540 in the optical axis direction. According to an embodiment, since each of components of the first AF actuator 500 corresponding to the first end (a) and the second end (b) of the AF actuator are separately controlled, it is possible to compensate for tilt that may occur due to the height difference between the first end (a) and the second end (b) in the optical axis direction. For example, as the first AF actuator 500 is driven, the first end (a) and the second end (b) may be located at substantially the same displacement in the optical axis direction.

According to an embodiment, the AF carrier 540 may include AF balls 530 (e.g., the AF balls 230 of FIG. 2) on one side surface thereof. According to an embodiment, the lens barrel (e.g., the lens barrel described with reference to FIG. 1) may move inside the housing (e.g., the second housing 240 of FIG. 2) by the rolling motion of the AF balls 530. According to an embodiment, when the AF carrier 540 is moved by the electromagnetic force generated between the first AF coil 511 and the first AF magnet 513, the AF carrier 540 may be moved by the rolling motion of the AF ball 530.

Referring to FIG. 6, the camera module 180 may include a second AF actuator 600 to execute an AF function. In an embodiment, the second AF actuator 600 may include an AF carrier 640, a third AF driver IC 612 (e.g., the second driver IC 223 of FIG. 2), a fourth AF driver IC 622 (e.g., the second driver IC 223 of FIG. 2), a third AF magnet 613 (e.g., the first magnet 211 of FIG. 2), a fourth AF magnet 623 (e.g., the second magnet 213 of FIG. 2), a third AF coil 611 (e.g., the first coil 225 of FIG. 2), and a fourth AF coil 621 (e.g., the second coil 227 of FIG. 2). The third AF driver IC 612 and the fourth AF driver IC 622 are respectively disposed at the opposite ends of the AF actuator according to an embodiment to control the opposite ends of the second AF actuator 600, respectively.

According to an embodiment, the third AF coil 611 and the fourth AF coil 621 may execute the same and/or similar operations as the first AF coil 511 and the second AF coil 521, respectively. In addition, the third AF magnet 613 and the fourth AF magnet 623 may execute the same and/or similar operations as the first AF magnet 513 and the second AF magnet 523, respectively. In addition, the third AF driver IC 612 and the fourth AF driver IC 622 may execute the same and/or similar operations as the first AF driver IC 512 and the second AF driver IC 522, respectively. Accordingly, the third AF driver IC 612 may include a third AF position sensor that executes an operation similar to that of the first AF position sensor. In addition, the fourth AF driver IC 622 may include a fourth AF position sensor that executes an operation similar to that of the second AF position sensor.

According to an embodiment, components of the AF actuator respectively corresponding to the first end (a) and the second end (b) of the AF actuator may be separately controlled. Thus, it is possible to compensate for tilt that may occur due to the height difference between the first end (a) and the second end (b) in the optical axis direction. According to an embodiment, the AF carrier 540 of FIG. 5 and the AF carrier 640 of FIG. 6 may execute the same and/or similar operations.

According to an embodiment, the AF carrier 640 of FIG. 6 may include an AF shaft (not illustrated) on one side surface. According to an embodiment, a lens barrel may be slidably installed on the shaft extending in an optical axis direction. Accordingly, by sliding on the shaft, the lens barrel or the AF carrier 640 may move inside the housing (e.g., the second housing 240 of FIG. 2). According to an embodiment, when the AF carrier 640 is moved by the electromagnetic force generated between the third AF coil 611 and the third AF magnet 613, the AF carrier 640 may be moved by sliding on the AF shaft. According to an embodiment, when the AF carrier 640 is moved by the electromagnetic force generated between the fourth AF coil 621 and the fourth AF magnet 623, the AF carrier 640 may be moved by sliding on the AF shaft.

Figure 7A:
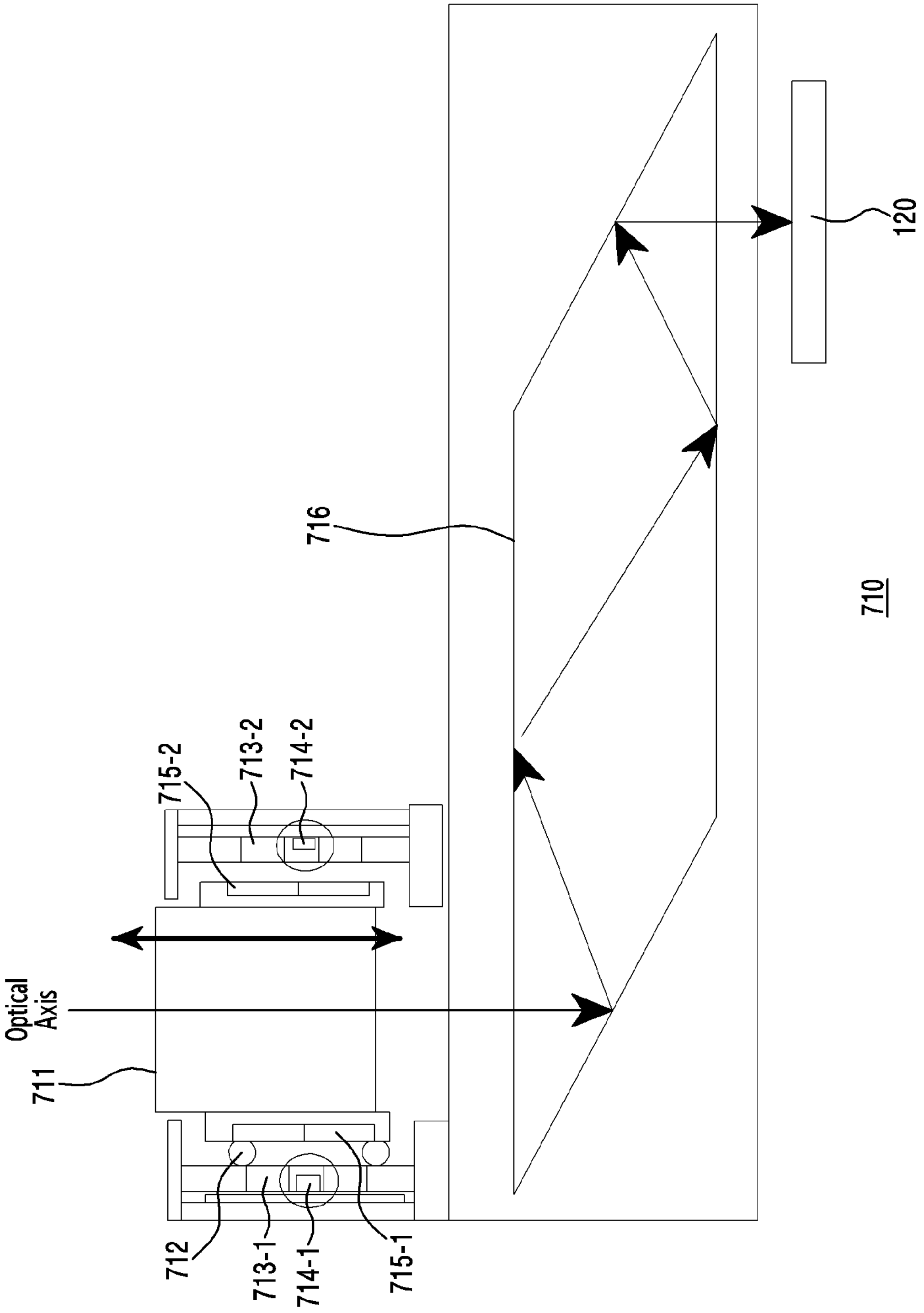
FIG. 7A is a view illustrating a movement path of light by a ball-type AF actuator including a folded-type optical system according to an embodiment of the disclosure.

FIG. 7A is a view illustrating a movement path of light by a ball-type (or refractive ball-type) AF actuator including a folded-type optical system according to an embodiment of the disclosure.

Figure 7B:
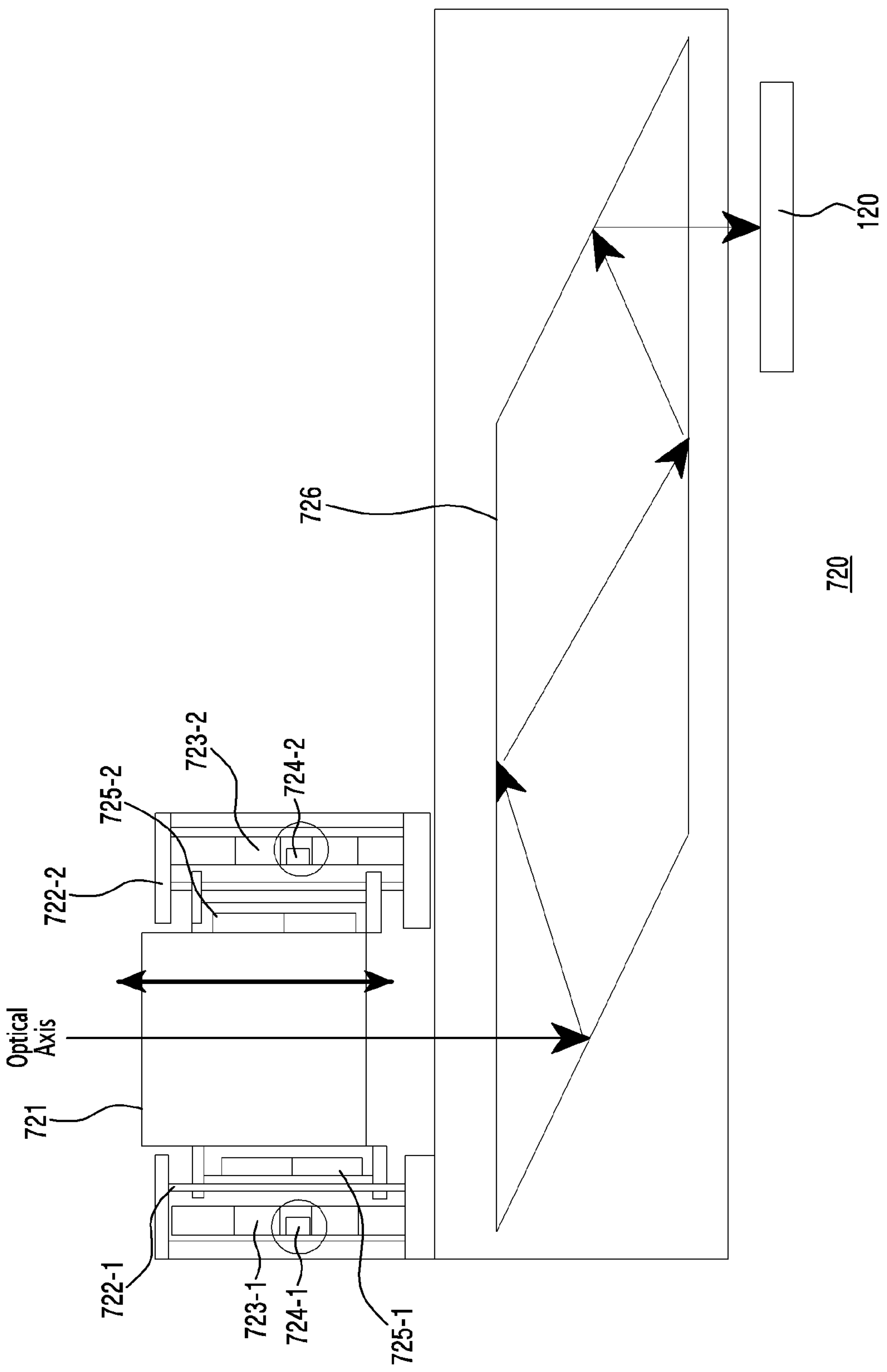
FIG. 7B is a view illustrating a movement path of light by a shaft-type AF actuator including a folded-type optical system according to an embodiment of the disclosure.

FIG. 7B is a view illustrating a movement path of light by a shaft-type (or refractive shaft-type) AF actuator including a folded-type optical system according to an embodiment of the disclosure.

Figure 8:
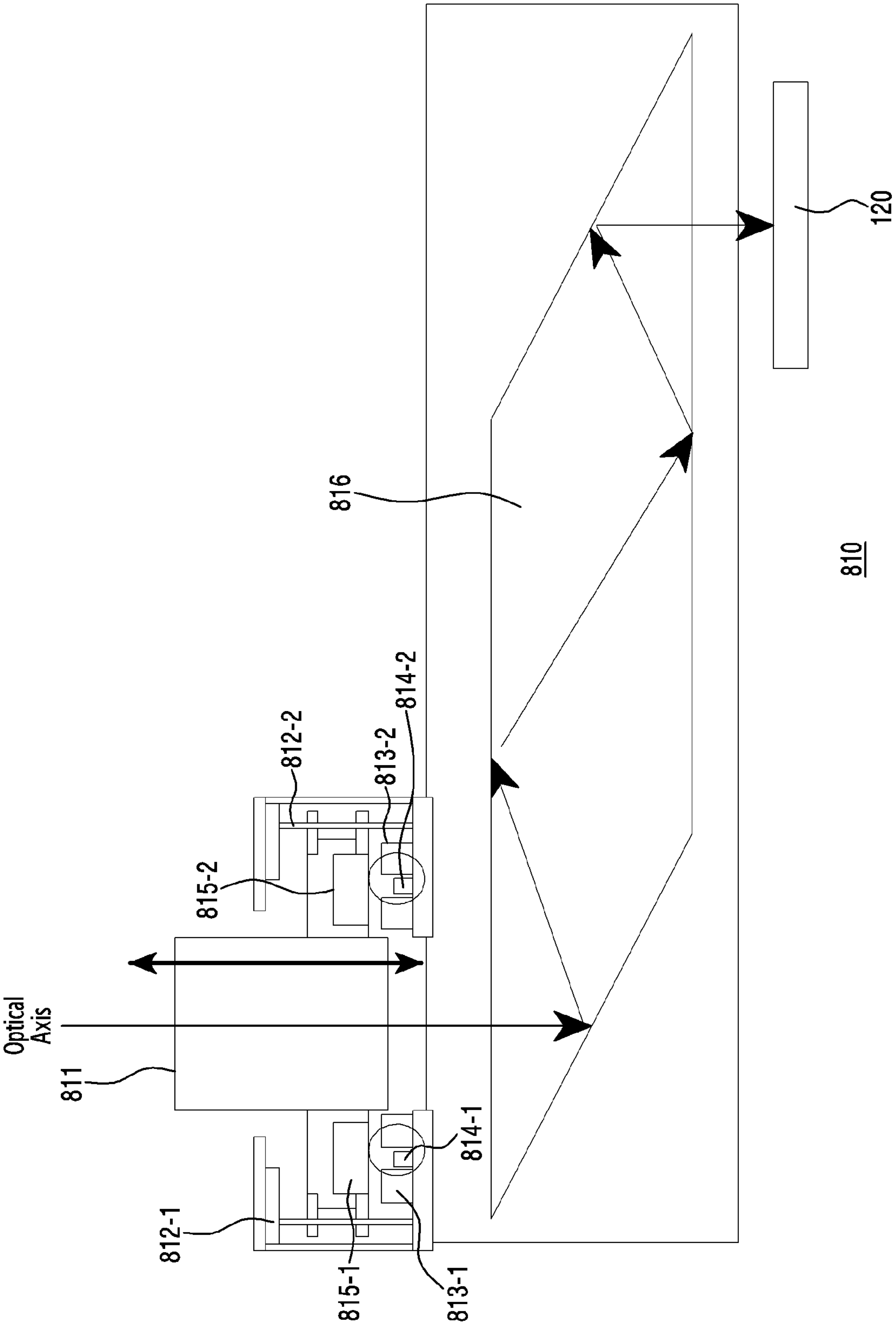
FIG. 8 illustrates a camera module including a folded-type optical system in which an AF magnet is disposed at a lower end according to an embodiment of the disclosure.

FIG. 8 illustrates a camera module including a folded-type optical system in which an AF magnet is disposed at a lower end according to an embodiment of the disclosure.

Referring to FIGS. 7A, 7B, and/or 8, a curved camera module (e.g., the camera module 180) is illustrated. FIGS. 7A, 7B, and/or 8 may be distinguished depending on whether a method of moving the lens assembly 111 in an optical axis direction is a ball type or a shaft type. Therefore, other configurations and operations for AF driving may be similar. Accordingly, descriptions overlapping those described with reference to FIGS. 1 to 6 may be omitted.

FIGS. 7A, 7B, and/or 8 illustrate a refractive optical system in which a light path from a subject to an image sensor (e.g., the image sensor 120 of FIG. 1) via a lens assembly (e.g., the lens assembly 111 of FIG. 1) and a prism is refracted one or more times.

Referring to FIG. 7A, a camera module 180 (e.g., the camera module 180 of FIG. 1) may include an AF actuator (e.g., the AF actuator of FIG. 2, the first AF actuator 500 of FIG. 5, and/or the second AF actuator 600 of FIG. 6) to execute an AF function. In an embodiment, a refractive ball-type AF actuator 710 may include a first lens assembly 711 (e.g., the lens assembly 111 of FIG. 1), a first refractive AF driver IC 714-1 (e.g., the first driver IC 221 of FIG. 2), a second refractive AF driver IC 714-2 (e.g., the second driver IC 223 in FIG. 2), a first refractive AF magnet 715-1 (e.g., the first magnet 211 in FIG. 2), a second refractive AF magnet 715-2 (e.g., the second magnet 213 in FIG. 2), a first refractive AF coil 713-1 (e.g., the first coil 225 in FIG. 2), and a second refractive AF coil 713-2 (e.g., the second coil 227 in FIG. 2). The first refractive AF driver IC 714-1 and the second refractive AF driver IC 714-2 may be respectively disposed at the opposite ends of the AF actuator according to an embodiment to control the opposite ends of the AF actuator, respectively.

According to an embodiment, the refractive ball-type AF actuator 710 of FIG. 7A may include a refractive optical system in which an optical path from a subject to the image sensor 120 described with reference to FIG. 1 via the first lens assembly 711 and the first prism 716 is refracted one or more times. Accordingly, the refractive ball-type AF actuator 710 may execute an AF function by moving the first lens assembly 711 in the optical axis direction.

For example, the refractive ball-type AF actuator 710 may control the current applied to the first refractive AF coil 713-1 via the first refractive AF driver IC 714-1. According to an embodiment, when a current is applied to the first refractive AF coil 713-1, the first lens assembly 711 may be moved in the optical axis direction by the magnetic force generated between the first refractive AF magnet 715-1 and the first refractive AF coil 713-1. In addition, the refractive ball-type AF actuator 710 of the camera module 180 may perform control such that the current applied to the second refractive AF coil 713-2 via the second refractive AF driver IC 714-2 is different from the current applied to the first refractive AF coil 713-1. According to an embodiment, when a current is applied to the second refractive AF coil 713-2, the first lens assembly 711 may be moved in the optical axis direction by the magnetic force generated between the second refractive AF magnet 715-2 and the first refractive AF coil 713-2.

According to an embodiment, the first refractive AF driver IC 714-1 and the second refractive AF driver IC 714-2 may control the magnitudes of the currents applied to the first refractive AF coil 713-1 and the second refractive AF coil 713-2 based on the calibration values stored in the memory (e.g., the memory 440 in FIG. 4 or the memory 1130 in FIG. 11) of the electronic device 100. For example, the first refractive AF driver IC 714-1 and the second refractive AF driver IC 714-2 may control the movement of the first lens assembly 711 in the optical axis direction by using calibration values that allow the opposite ends of the AF actuator to have substantially the same strokes. According to an embodiment, the calibration values may include a value determined by applying the same stroke adjustment process to the opposite ends of the AF actuator in a process operation of the electronic device 100. An embodiment of configuring calibration values according to an embodiment will be described later with reference to FIG. 9.

According to an embodiment, each of the first refractive AF driver IC 714-1 and the second refractive AF driver IC 714-2 may include a built-in position sensor. For example, the first refractive AF driver IC 714-1 may include a first refractive AF position sensor (e.g., the first AF position sensor described with reference to FIG. 2). For example, the second refractive AF driver IC 714-2 may include therein a second refractive AF position sensor (e.g., the first AF position sensor described with reference to FIG. 2).

According to an embodiment, at least one position sensor may detect the displacement of the lens assembly based on the position of at least one carrier and a magnet moving together with the lens assembly. According to an embodiment, the first refractive AF position sensor may measure the position of the first refractive AF magnet 715-1 facing the first refractive AF position sensor same with respect to the first refractive AF position sensor through interaction with the first refractive AF magnet 715-1 facing the first refractive AF position sensor. For example, the first refractive AF position sensor detects the position of the first refractive AF magnet 715-1 facing the first refractive AF position sensor by measuring a change in a magnetic field formed by the first refractive AF magnet 715-1 facing the first refractive AF position sensor. Therefore, the first refractive AF position sensor may be built in the first refractive AF driver IC 714-1 at the center of the first refractive AF coil 713-1 and may be configured to measure the position of the first refractive AF magnet 715-1 with respect to the first refractive AF position sensor in the optical axis direction. According to an embodiment, the first refractive AF driver IC 714-1 may detect the displacement of the first lens assembly 711 in the optical axis direction measured via the first refractive AF position sensor and may control the current applied to the first refractive AF coil 713-1 based on a calibration value stored in the memory (e.g., the memory 440 of FIG. 4 or the memory 1130 of FIG. 11). For example, the first refractive AF driver IC 714-1 may adjust the current applied to the first refractive AF coil 713-1 to control the first lens assembly 711 to be located at a position determined based on the calibration value.

According to an embodiment, the second refractive AF position sensor may measure the position of the second refractive AF magnet 715-2 facing the second refractive AF position sensor with respect to the second AF position sensor through interaction with the second refractive AF magnet 715-2 facing the second refractive AF position sensor. For example, the second refractive AF position sensor detects the position of the second refractive AF magnet 715-2 facing the second refractive AF position sensor by measuring a change in a magnetic field formed by the second refractive AF magnet 715-2 facing the second refractive AF position sensor. Therefore, the second refractive AF position sensor may be built in the second refractive AF driver IC 714-2 at the center of the second refractive AF coil 713-2 and may be configured to measure the position of the second refractive AF magnet 715-2 with respect to the second refractive AF position sensor in the optical axis direction. According to an embodiment, the second refractive AF driver IC 714-2 may detect the displacement of the first lens assembly 711 in the optical axis direction measured via the second refractive AF position sensor and may control the current applied to the second refractive AF coil 713-2 based on a calibration value stored in the memory (e.g., the memory 440 of FIG. 4 or the memory 1130 of FIG. 11). For example, the second refractive AF driver IC 714-2 may adjust the current applied to the second refractive AF coil 713-2 to control the first lens assembly 711 to be located at a position determined based on the calibration value. Accordingly, the components of the AF actuator respectively corresponding to the opposite ends (e.g., the first end (a) and the second end (b) of FIG. 5) distinguished based on the optical axis of the AF actuator may be controlled separately. Thus, it is possible to compensate for tilt based on the distortion of the first lens assembly 711. For example, since each of the opposite ends of the first lens assembly 711 is separately controlled, it is possible to effectively compensate for the distortion of the first lens assembly 711.

According to an embodiment, the refractive ball-type AF actuator 710 may include refractive AF balls 712 (e.g., the AF balls 230 of FIG. 2) on at least one side surface thereof. According to an embodiment, the first lens assembly 711 may move inside the housing (e.g., the second housing 240 of FIG. 2) by the rolling motion of the refractive AF balls 712. According to an embodiment, by the electromagnetic force generated between the first refractive AF coil 713-1 and the first refractive AF magnet 715-1 and between the second refractive AF coil 713-2, and the second refractive AF magnet 715-2, the first lens assembly 711 may move by the rolling motion of the refractive AF balls 712.

Referring to FIG. 7B, the camera module 180 may include an AF actuator to execute an AF function. In an embodiment, the first refractive shaft-type AF actuator 720 may include an AF actuator configured to execute an AF function. In an embodiment, the first refractive ball-type AF actuator 720 may include a second lens assembly 721 (e.g., the lens assembly 111 of FIG. 1), a third refractive AF driver IC 724-1 (e.g., the first driver IC 221 of FIG. 2), a fourth refractive AF driver IC 724-2 (e.g., the second driver IC 223 in FIG. 2), a third refractive AF magnet 725-1 (e.g., the first magnet 211 in FIG. 2), a fourth refractive AF magnet 725-2 (e.g., the second magnet 213 in FIG. 2), a third refractive AF coil 723-1 (e.g., the first coil 225 in FIG. 2), and a fourth refractive AF coil 723-2 (e.g., the second coil 227 of FIG. 2). The third refractive AF driver IC 724-1 and the fourth refractive AF driver IC 724-2 may be respectively disposed at the opposite ends of the AF actuator according to an embodiment to control the opposite ends of the AF actuator, respectively.

According to an embodiment, the third refractive AF coil 723-1 and the fourth refractive AF coil 723-2 may execute the same and/or similar operations as the first refractive AF coil 713-1 and the second refractive AF coil 713-2, respectively. In addition, the third refractive AF magnet 725-1 and the fourth refractive AF magnet 725-2 may execute the same and/or similar operations as the first refractive AF magnet 715-1 and the second refractive AF magnet 715-2, respectively. In addition, the third refractive AF driver IC 724-1 and the fourth refractive AF driver IC 724-2 may execute the same and/or similar operations as the first refractive AF driver IC 714-1 and the second refractive AF driver IC 714-12, respectively. Accordingly, the third refractive AF driver IC 724-11 may include a third refractive AF position sensor that executes an operation similar to that of the first refractive AF position sensor. In addition, the fourth refractive AF driver IC 724-12 may include a fourth refractive AF position sensor that executes an operation similar to that of the second refractive AF position sensor.

According to an embodiment, since the third refractive AF driver IC 724-1 and the fourth refractive AF driver IC 724-2 control the currents applied to the third refractive AF coil 723-1 and the fourth refractive AF coil 723-2, respectively, the second lens assembly 721 may move in the optical axis direction to compensate for distortion of the second lens assembly 721 while executing an AF function.

The first refractive shaft-type AF actuator 720 of FIG. 7B may include a refractive optical system in which an optical path from a subject to the image sensor 120 described with reference to FIG. 1 via the second lens assembly 721 and the second prism 726 is refracted one or more times. Accordingly, the refractive shaft-type AF actuator 720 may execute an AF function by moving the first lens assembly 711 in the optical axis direction.

According to an embodiment, the first refractive shaft-type AF actuator 720 of FIG. 7B may include a first AF shaft 722 on at least one side surface. According to an embodiment, the second lens assembly 721 may be slidably installed on the shaft extending in the optical axis direction. Accordingly, by being slid on a first AF shaft 722-1 and/or a second AF shaft 722-2, the second lens assembly 721 may move inside a housing (e.g., the second housing 240 of FIG. 2). According to an embodiment, when the second lens assembly 721 is moved by the electromagnetic force generated between the third refractive AF coil 723-1 and the third refractive AF magnet 725-1 and between the fourth refractive AF coil 723-2 and the fourth refractive AF magnet 725-2, the second lens assembly 721 may move by sliding on a first AF shaft 722-1 and/or a second AF shaft 722-2. In this case, since each of the opposite ends of the second lens assembly 721 is separately controlled, it is possible to effectively compensate for the distortion of the second lens assembly 721.

Referring to FIG. 8, a camera module 180 may include an AF actuator to execute an AF function. In an embodiment, a second refractive shaft-type AF actuator 810 may include an AF actuator configured to execute an AF function. In an embodiment, the second refractive shaft-type AF actuator 810 may execute an operation similar to that of the first refractive shaft-type AF actuator 720. However, the second refractive shaft-type AF actuator 810 may be arranged differently from the first refractive shaft-type AF actuator 720 to be configured as a solenoid type.

According to an embodiment, the second refractive shaft-type AF actuator 810 may include a fifth refractive AF driver IC 814-1 and a sixth refractive AF driver IC 814-2 disposed on a plane substantially perpendicular to the optical axis. In addition, the second refractive shaft-type AF actuator 810 may include a fifth refractive AF coil 813-1 and a sixth refractive AF coil 813-2 disposed on a plane substantially perpendicular to the optical axis. In addition, the second refractive shaft-type AF actuator 810 may include a fifth refractive AF magnet 815-1 disposed in a direction facing the fifth refractive AF coil 813-1 and a sixth refractive AF coil 815-2 disposed in a direction facing the sixth refractive AF coil 813-2.

According to an embodiment, at the opposite ends of the second refractive shaft-type AF actuator 810, the fifth refractive AF driver IC 814-1 and the sixth refractive AF driver IC 814-2 may be respectively disposed to move the third AF shaft 812-1 and/or the fourth AF shaft 812-2 in the optical axis direction.

For example, the fifth refractive AF coil 813-1 may be disposed to be substantially perpendicular to the optical axis direction and to face the fifth refractive AF magnet 815-1. In addition, the sixth refractive AF coil 813-2 may be disposed to be substantially perpendicular to the optical axis direction and to face the sixth refractive AF magnet 815-2.

According to an embodiment, the fifth refractive AF coil 813-1 and the fifth refractive AF magnet 815-1 may generate a magnetic force (an attractive force and/or a repulsive force) through interaction. Accordingly, the third AF shaft 812-1 and/or the fourth AF shaft 812-2 may be moved in the optical axis direction. For example, a current flows through the fifth refractive AF coil 813-1 to generate a magnetic field, and the third AF shaft 812-1 and/or the fourth AF shaft 812-2 may be moved in the optical axis direction by using an attractive and/or a repulsive force generated with the fifth refractive AF magnet 815-1 due to the magnetic field. According to the disclosure, the AF actuator of the type that generates an attractive force and/or a repulsive force as described above may be referred to as a solenoid type.

According to an embodiment, the sixth refractive AF coil 813-2 may execute an operation similar to that of the fifth refractive AF coil 813-1, and the sixth refractive AF magnet 815-2 may execute an operation similar to that of the fifth refractive AF magnet 815-1. Accordingly, the third AF shaft 812-1 and/or the fourth AF shaft 812-2 may be moved in the optical axis direction.

According to an embodiment, as the third AF shaft 812-1 and/or the fourth AF shaft 812-2 move in the optical axis direction, the third lens assembly 811 may move in the optical axis direction.

According to an embodiment, the fifth refractive AF driver IC 814-1 may include therein a fifth refractive AF position sensor configured to execute an operation similar to that of the first refractive AF position sensor. In addition, the sixth refractive AF driver IC 814-2 may include therein a sixth refractive AF position sensor configured to execute an operation similar to that of the fourth refractive AF position sensor.

According to an embodiment, the fifth refractive AF driver IC 814-1 and the sixth refractive AF driver IC 814-2 may respectively control the currents applied to the fifth refractive AF coil 813-1 and the sixth refractive AF coil 813-2. Accordingly, a magnetic field may be formed in each of the fifth refractive AF coil 813-1 and the sixth refractive AF coil 813-2, and the third lens assembly 811 may move in the optical axis direction to compensate for distortion of the third lens assembly 811 while executing an AF function.

According to various embodiments, components of the AF actuator may be arranged in various ways without being limited to those illustrated in FIGS. 7A, 7B, and 8. For example, in the second refractive shaft-type AF actuator 810, the fifth refractive AF driver IC 814-1, the sixth refractive AF driver IC 814-2, the fifth refractive AF coil 813-1, the sixth refractive AF coil 813-2, the fifth refractive AF magnet 815-1, and the sixth refractive AF magnet 815-2 may be disposed under a third prism 816, and some of the above-mentioned components may include a support member coupled to the AF carrier to move the third lens assembly 811 in the optical axis. In an embodiment, components of the refractive ball-type AF actuator 710, the first refractive shaft-type AF actuator 720, or the second refractive shaft-type AF actuator 810 are not limited to those illustrated in the drawings, and may be arranged separately to control (or move) the lens assembly (e.g., the first lens assembly 711, the second lens assembly 721, or the third lens assembly 811) and/or the prism (e.g., the first prism 716, the second prism 726, or the third prism 816.

For example, the fifth refractive AF driver IC 814-1, the sixth refractive AF driver IC 814-2, the fifth refractive AF coil 813-1, the sixth refractive AF coil 813-2, and the fifth refractive AF magnet 815-1, and the sixth refractive AF magnet 815-2 may be disposed under the third prism 816, and some of the above-mentioned components may include a support member coupled to the third AF shaft 812-1 and/or the fourth AF shaft 812-2. Accordingly, the second refractive shaft-type AF actuator 810 may move the third lens assembly 811 in the optical axis direction by sliding on the third AF shaft 812-1 and/or the fourth AF shaft 812-2. Alternatively, the fifth refractive AF driver IC 814-1, the fifth refractive AF coil 813-1, and the fifth refractive AF magnet 815-1 may be disposed on the side surface of the lens assembly 811, and the sixth refractive AF driver IC 814-2, the sixth refractive AF coil 813-2, and the sixth refractive AF magnet 815-2 may be disposed on the side surface of the third prism 816.

According to an embodiment, the surface facing the second lens assembly 721 among flat surfaces of the second prism 726 and/or the surface facing the third lens assembly 811 among flat surfaces of the third prism 816 may be referred to as an upper end portion. In addition, each surface of the second prism 726 and/or the third prism 816 facing the image sensor 120 may be referred to as a lower end portion. In an embodiment, the surfaces of the second prism 726 and/or the third prism 816 surrounding the upper end and the lower end may be referred to as a side surface.

According to an embodiment, the third refractive AF driver IC 724-1, the third refractive AF coil 723-1, and the third refractive AF magnet 725-1 may be disposed to face one of the side surfaces of the second prism 726. In addition, the fourth refractive AF magnet 725-2, the fourth refractive AF driver IC 724-2, and the fourth refractive AF coil 723-2 may be disposed to face one of the side surfaces of the second prism 726. According to an embodiment, when the components are disposed on at least one of the side surfaces of the second prism 726 as described above, the OIS or the sensor OIS may be executed based on one axis of the second prism 726 and the inside and/or one axis of the second lens assembly 721.

According to an embodiment, the fifth refractive AF driver IC 814-1, the fifth refractive AF coil 813-1, and the fifth refractive AF magnet 815-1 may be disposed to face one of the side surfaces of the third prism 816. In addition, the sixth refractive AF magnet 815-2, the sixth refractive AF driver IC 814-2, and the sixth refractive AF coil 813-2 may be disposed to face one of the side surfaces of the third prism 816. According to an embodiment, when the components are disposed on at least one of the side surfaces of the third prism 816 as described above, the OIS or the sensor OIS may be executed based on one axis of the third prism 816 and the inside and/or one axis of the third lens assembly 811.

Figure 9:
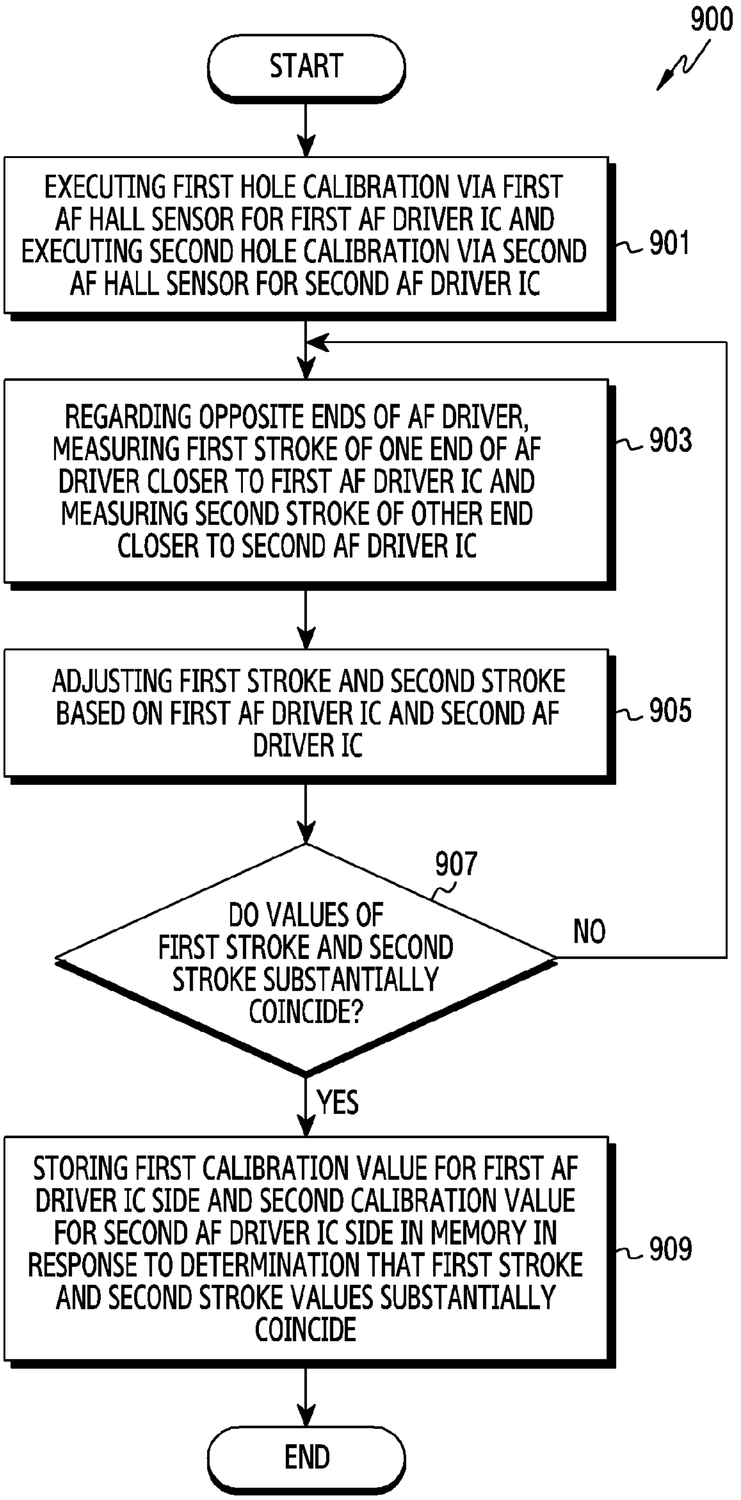
FIG. 9 is a flowchart illustrating an operation of determining a calibration value through a stroke adjustment process according to an embodiment of the disclosure.

FIG. 9 is a flowchart (900) illustrating an operation of determining a calibration value through a stroke adjustment process according to an embodiment of the disclosure.

Referring to FIG. 9, in a method 900, in operation 901, in order to adjust the strokes of the opposite ends of the AF actuator in the process, the processor (e.g., the processor 410 of FIG. 4 and the processor 1120 of FIG. 11) may execute first hole calibration via the first AF position sensor (e.g., the first hole sensor described with reference to FIG. 2) for the first AF driver IC (e.g., the first driver IC 221 of FIG. 2) and execute second hole calibration via the second AF position sensor (e.g., the second hole sensor described with reference to FIG. 2) for the second AF driver IC (e.g., the second driver IC 223 of FIG. 2).

According to an embodiment, in operation 903, regarding the opposite ends of the AF actuator, the processor may measure a first stroke of one end of the AF actuator on the first AF driver IC side and a second stroke of the other end on the second AF driver IC side. For example, regarding the opposite ends of the AF actuator distinguished with reference to the lens assembly 111, the processor may measure the first stroke of the position measured with reference to the reference position (e.g., the center of the range of moving of the first AF magnet within the second housing 240 or a location adjacent to the base portion of the second housing 240) of the first AF magnet (e.g., the first magnet 211 of FIG. 2) facing the first AF hole sensor in the optical axis direction via the first AF hole sensor built in the first AF driver IC. In addition, regarding the opposite ends of the AF actuator distinguished with reference to the lens assembly 111, the processor may measure the second stroke of the position measured with reference to a reference position (e.g., the center of the range of moving of the first AF magnet within the second housing 240 or a location adjacent to the base portion of the second housing 240) of the second AF magnet (e.g., the second magnet 213 of FIG. 2) facing the second AF hole sensor in the optical axis direction via the second AF hole sensor built in the second AF driver IC.

According to an embodiment, in operation 905, the processor may adjust the first stroke and the second stroke based on the first AF driver IC and the second AF driver IC. For example, the position of the first AF magnet may be adjusted by controlling the current applied to the first AF coil (e.g., the first coil 225 of FIG. 2) of the first AF actuator via the first AF driver IC. For example, the position of the second AF magnet may be adjusted by controlling the current applied to the second AF coil (e.g., the second coil 227 of FIG. 2) of the second AF actuator via the second AF driver IC.

According to an embodiment, in operation 907, the processor may determine whether the first stroke value and the second stroke value substantially coincide. For example, with respect to a reference position (e.g., the center of the range of moving of the first AF magnet within the second housing 240 or a location adjacent to the base portion of the second housing 240), the processor determines whether the height of the first AF magnet from the reference position and the height of the second AF magnet from the reference position substantially coincide. For example, the processor may determine whether the first stroke value and the second stroke value coincide. For example, the processor may determine whether the difference between the first stroke value and the second stroke value is less than a threshold value. In an embodiment, the threshold value may mean a value for determining that the first and second stroke values substantially coincide.

According to an embodiment, in operation 909, the processor may store a first calibration value for the first AF driver IC side and a second calibration value for the second AF driver IC side in a memory (e.g., the memory 440 of FIG. 4 or the memory 1130 of FIG. 11) in response to the determination that the first stroke and second stroke values substantially coincide. For example, the electronic device 100 may store the first calibration value in a memory included in the first AF driver IC and store the second calibration value in a memory included in the second AF driver IC. According to an embodiment, the first calibration value may be determined based on a current value applied to the first AF coil by the first AF driver IC when the first stroke and the second stroke are the same. According to an embodiment, the second calibration value may correspond to a current value applied to the second AF coil by the second AF driver IC when the first stroke and the second stroke are the same.

According to an embodiment, when the first stroke and the second stroke do not substantially coincide, the electronic device 100 may repeatedly execute operation 905 in operation 907.

Figure 10:
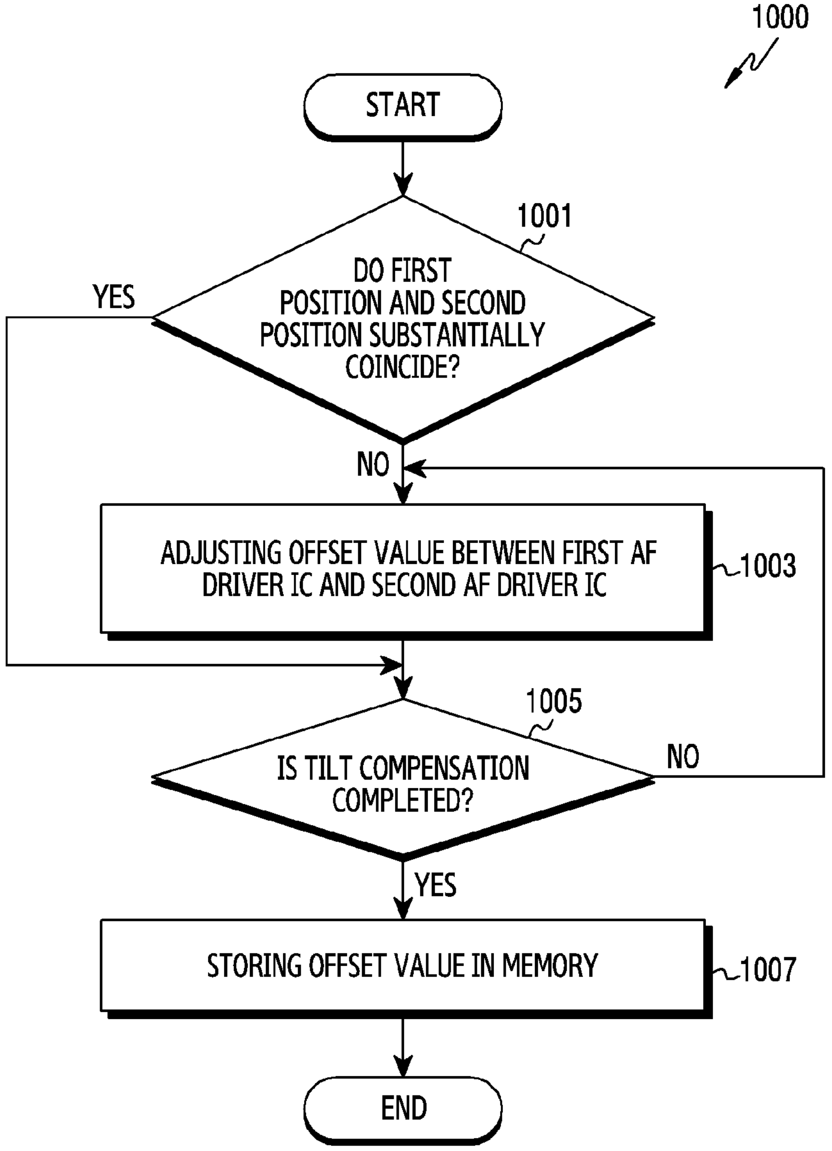
FIG. 10 is a flowchart illustrating an operation of determining an offset value through an additional adjustment process according to an embodiment of the disclosure.

FIG. 10 is a flowchart (1000) illustrating an operation of determining an offset value through an additional adjustment process according to an embodiment of the disclosure.

Referring to FIG. 10, an electronic device (e.g., the electronic device 100 of FIG. 1) may compensate for inclination and/or distortion occurring during an assembly process of a camera module (e.g., the camera module 180 of FIG. 1). Hereinafter, inclination and/or distortion may be expressed as tilt.

In the process of assembling the camera module 180 of the electronic device 100, distortion and/or inclination of a lens assembly (e.g., the lens assembly 111 of FIG. 1) may occur. For example, inclination and/or distortion may occur in a process of disposing the lens assembly 111 on one component of a base housing (e.g., the housing 240 of FIG. 2).

According to an embodiment, the inclination and/or distortion occurring in the above additional process may be compensated for by adjusting an offset value. For example, the offset value may be a value stored in an AF driver IC (e.g., the AF driver IC 420 of FIG. 4) or a separate memory (e.g., the memory 440 of FIG. 4). The offset value may be utilized as a calibration value. For example, the offset value for the first position sensor may be utilized as a calibration value associated with the position of the first AF magnet. The offset value with respect to the second position sensor may be utilized as a calibration value with respect to the position of the second AF magnet.

According to an embodiment, a processor (e.g., the processor 410 of FIG. 4 or the processor 1120 of FIG. 11) may determine whether AF tilt compensation is required based on the inclination and/or distortion occurring in the additional process. For example, in operation 1001, the processor may determine whether a first position and a second position substantially coincide. According to an embodiment, the first position may indicate a position of the first AF magnet (e.g., the first magnet 211 of FIG. 2) from a reference position (e.g., the center of the range of moving of the first AF magnet within the second housing 240 or a location adjacent to the base portion of the second housing 240). According to an embodiment, the second position may indicate a position of the second AF magnet (e.g., the second magnet 213 of FIG. 2) from a reference position (e.g., the center of the range of moving of the first AF magnet within the second housing 240 or a location adjacent to the base portion of the second housing 240).

According to an embodiment, the processor may determine that the first position and the second position substantially coincide when the first position and the second position coincide or differ by less than a threshold value. In an embodiment, the processor may execute operation 1005 when the first position and the second position substantially coincide.

In an embodiment, when the first position and the second position do not substantially coincide, in operation 1003, the processor may adjust an offset value between the first AF driver IC (e.g., the first driver IC 221 of FIG. 2) and the second AF driver IC (e.g., the second driver IC 223 of FIG. 2). According to an embodiment, the offset value may include information for controlling a current applied to the first AF coil (e.g., the first coil 225 of FIG. 2) facing the first AF magnet and the second coil (e.g., the second coil 227 of FIG. 2) facing the second AF magnet.

According to an embodiment, in operation 1005, the processor may determine whether tilt compensation is completed. For example, the processor may apply a current to the first AF coil and the second coil based on the offset value and may determine whether the first position and the second position substantially coincide.

Figure 11:
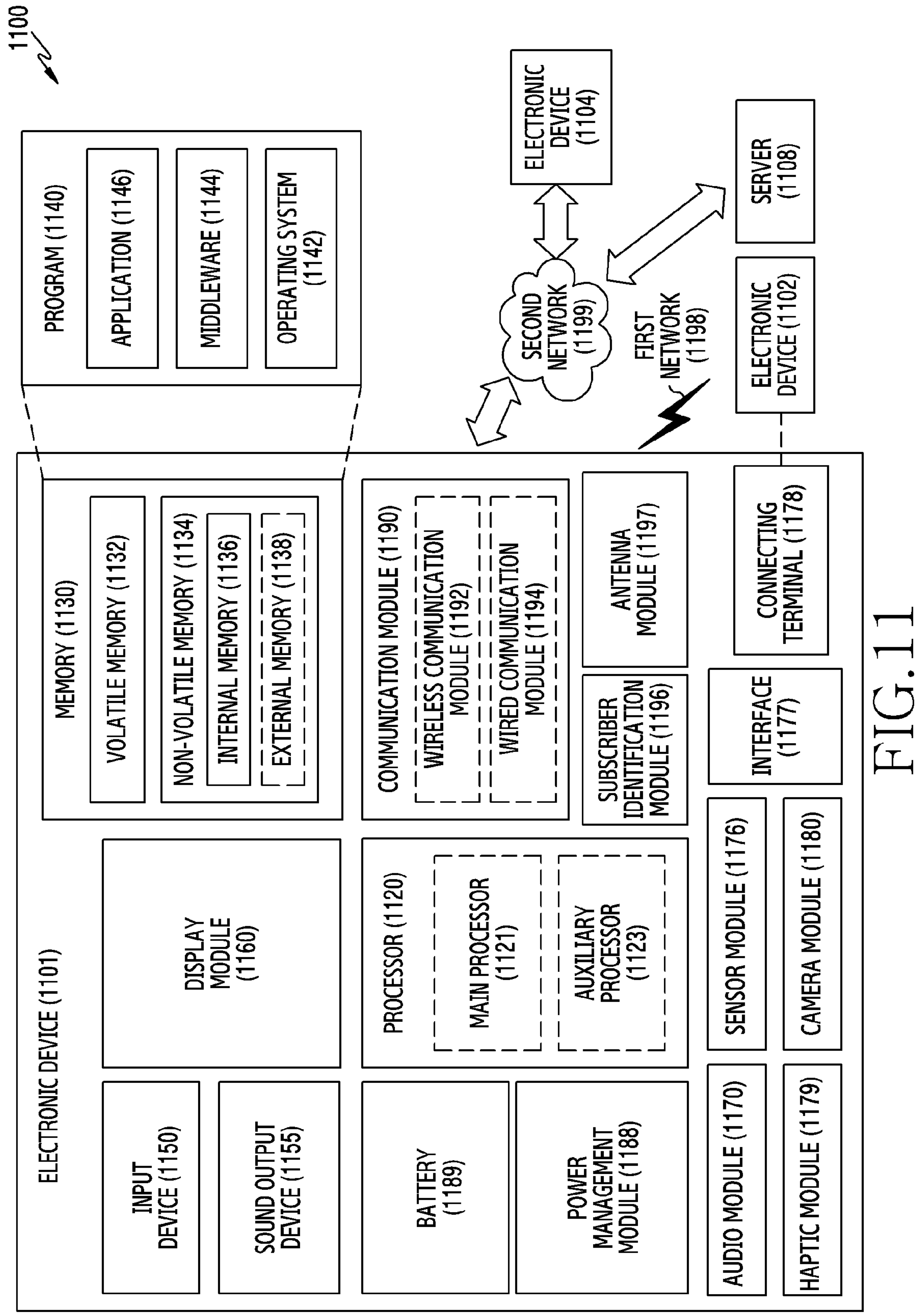
FIG. 11 is a view illustrating an electronic device within a network environment according to an embodiment of the disclosure.

In an embodiment, when it is determined that the first position and the second position substantially coincide, in operation 1007, the processor may store the determined offset value in a memory (e.g., the memory 440 of FIG. 4, the memory 1130 of FIG. 11, or the memory in the AF driver IC).

In an embodiment, the processor may execute operation 1003 again when it is determined that the tilt compensation is not completed (e.g., when the difference between the first position and the second position is greater than or equal to a threshold value).

The operation of the electronic device 100 described with reference to FIGS. 1 to 6, 7A, 7B, and 8 to 10 may be expressed as an operation of the camera module 180 and/or at least a processor.

As described above, an electronic device according to an embodiment of the disclosure may include a housing, a lens assembly comprising at least one lens aligned along an optical axis, and an AF actuator to move the lens assembly within the housing. The AF actuator may include an AF carrier including a first AF magnet disposed on a first surface of the lens assembly and a second AF magnet disposed on a second surface facing a direction opposite to the first surface with respect to the lens assembly, a first AF coil disposed to face the first AF magnet, a first driving circuit including a first position sensor detecting a position of the first AF magnet and configured to control a current applied to the first AF coil, a second AF coil disposed to face the second AF magnet, and a second driving circuit including a second position sensor detecting a position of the second AF magnet and configured to control a current applied to the second AF coil. The first driving circuit may be configured to control the current applied to the first AF coil based on the position of the first AF magnet detected by the first position sensor and the position of the second AF magnet detected by the second position sensor to move the lens assembly based on a direction of the optical axis, and the second driving circuit may be configured to control the current applied to the second AF coil based on the position of the first AF magnet and the position of the second AF magnet to move the lens assembly based on the direction of the optical axis.

According to an embodiment, the electronic device may further include a memory, and the memory may be configured to store a first calibration value related to the current applied to the first AF coil via the first driving circuit, and to store a second calibration value related to the current applied to the second AF coil via the second driving circuit.

According to an embodiment, the electronic device may further comprise at least one processor. The at least one processor may determine a value for controlling the current applied to said first AF coil based on the first calibration value stored in the memory, and may determine a value for controlling the current applied to the second AF coil based on the second calibration value stored in the memory.

According to an embodiment, the first calibration value and the second calibration value are values that compensate for a tilt generated from a height difference between the first surface and the second surface of the lens assembly with respect to the housing.

According to an embodiment, the first driving circuit may include a first AF position sensor therein, and may be configured to measure the position of the first AF magnet relative to the first AF position sensor by using the first AF position sensor.

According to an embodiment, the second driving circuit may include a second AF position sensor therein, and may be configured to measure the position of the second AF magnet relative to the second AF position sensor by using the second AF position sensor.

According to an embodiment, the electronic device may be configured to determine a first calibration position by mapping the height of the first AF magnet from a reference position. The height of the first AF magnet may be determined based on the first calibration value.

According to an embodiment, the driving circuit may be configured to measure a first current position, which is the height of the first AF magnet from the reference position, by using a first AF position sensor, and to compare the first calibration position and the first current position, and to move the lens assembly based on a direction of the optical axis by controlling the current applied to the first AF coil based on the comparison result.

According to an embodiment, the electronic device may be configured to determine a second calibration position by mapping the height of the second AF magnet from the reference position. The height of the second AF magnet may be determined based on the second calibration value.

According to an embodiment, the second driving circuit may be configured to measure a second current position, which is the height of the second AF magnet from the reference position, by using a second AF position sensor, to compare the second calibration position and the second current position, and to move the lens assembly based on the direction of the optical axis by controlling the current applied to the second AF coil based on the comparison result.

According to an embodiment, the current applied to the first AF coil by the first driving circuit may be different from the current applied to the second AF coil by the second driving circuit.

According to an embodiment, the AF carrier may further include at least one AF ball, and the AF actuator may be configured to control the lens assembly to move based on the direction of the optical axis in response to rolling of the at least one AF ball.

According to an embodiment, the AF carrier may further include at least one AF shaft, and the AF actuator may be configured to control the lens assembly to move based on the direction of the optical axis in response to sliding of the at least one AF shaft.

According to an embodiment, the electronic device may further include a prism, and an image sensor configured to acquire the light passing through the lens assembly and the prism, wherein the prism is disposed to refract a path of light passing through the lens assembly toward the image sensor, or to refract a path of light to be incident to the lens assembly.

According to an embodiment, the electronic device may further include an AF driver IC connected to the first driving circuit and the second driving circuit, and the AF driver IC may be configured to control each of the first driving circuit and the second driving circuit.

According to an embodiment, the first driving circuit may be configured to control the current applied to the first AF coil based on a position of the second AF magnet with respect to the second AF position sensor, wherein the position is acquired by using the second AF position sensor, and the second driving circuit may be configured to control the current applied to the second AF coil based on a position of the first AF magnet with respect to the first AF position sensor, wherein the position is acquired by using the first AF position sensor.

According to an embodiment, the first drive circuit may control the current applied to the first AF coil based on a position of the first AF magnet relative to the first AF position sensor obtained using the first position sensor, and the second drive circuit may control the current applied to the second AF coil based on a position of the second AF magnet relative to the second position sensor obtained using the second position sensor.

As described above, a camera module according to an embodiment of the disclosure may include a housing, a lens assembly comprising at least one lens aligned along an optical axis, and an AF actuator to move the lens assembly within the housing. The AF actuator may include an AF carrier including a first AF magnet disposed on a first surface of the lens assembly and a second AF magnet disposed on a second surface facing a direction opposite to the first surface with respect to the lens assembly, a first AF coil disposed to face the first AF magnet, a first driving circuit including a first position sensor detecting a position of the first AF magnet and configured to control a current applied to the first AF coil, a second AF coil disposed to face the second AF magnet, and a second driving circuit including a second position sensor detecting a position of the second AF magnet and configured to control a current applied to the second AF coil. The first driving circuit may be configured to control the current applied to the first AF coil based on the position of the first AF magnet detected by the first position sensor and the position of the second AF magnet detected by the second position sensor to move the lens assembly based on a direction of the optical axis, and the second driving circuit may be configured to control the current applied to the second AF coil based on the position of the first AF magnet and the position of the second AF magnet to move the lens assembly based on the direction of the optical axis.

According to an embodiment, the first driving circuit may include a first memory configured to store a first calibration value related to the current applied to the first AF coil via the first driving circuit, and the second driving circuit may include a second memory configured to store a second calibration value related to the current applied to the second AF coil via the second driving circuit.

According to an embodiment, the first driving circuit may be configured to control the current applied to the first AF coil based on the first calibration value, and the second driving circuit may be configured to control the current applied to the second AF coil based on the second calibration value.

According to an embodiment, the first calibration value and the second calibration value may be values that compensate for a tilt generated from a height difference between the first surface and the second surface of the lens assembly with respect to the reference position.

According to an embodiment, the first driving circuit may include a first AF position sensor therein and may be configured to measure the position of the first AF magnet relative to the first AF position sensor by using the first AF position sensor, and the second driving circuit may include a second AF position sensor therein and may be configured to measure the position of the second AF magnet relative to the second AF position sensor by using the second AF position sensor.

According to an embodiment, the first driving circuit may be configured to measure a first current position, which is the height of the first AF magnet from the reference position, by using the first AF position sensor, to compare a first calibration position determined based on the first calibration value with the first current position, and to move the lens assembly based on the direction of the optical axis by controlling the current applied to the first AF coil based on the comparison result. The second driving circuit may be configured to measure a second current position, which is the height of the second AF magnet from the reference position, by using the second AF position sensor, to compare a second calibration position determined based on the second calibration value with the second current position, and to move the lens assembly based on the direction of the optical axis by controlling the current applied to the second AF coil based on the comparison result.

As a design to reduce the height of a camera module is required, efforts are being made to reduce the height of an AF actuator. However, as the height of the AF actuator decreases, the AF driving stroke decreases, so that the amount of error in the straightness of the length to which the AF shifts may increase at the same interval. Accordingly, distortion and/or inclination (e.g., tilt) of the AF actuator may increase. For example, since the height of the AF actuator decreases and the interval between ball bearings is shortened, tilt sensitivity due to tolerance may increase.

A camera module may include a refractive optical system in which light passing through an optical axis of a lens from a subject is refracted while passing through components of the optical system and is incident to an image sensor. When the camera module includes a folded-type optical system, which is a refractive optical system, a back focus length (BFL) is considerably longer. Thus, depending on the inclination of the lens, the amount of parallax variation of the top surface of the image sensor may be greater than that of the conventional one. As the height of the AF actuator for executing AF of the lens decreases, a large tilt of the lens may occur.

The technical problems to be addressed by the disclosure are not limited to those described above, and other technical problems, which are not described above, may be clearly understood from the following description by a person ordinarily skilled in the related art, to which the disclosure belongs.

According to various embodiments disclosed herein, it is possible to compensate for inclination, distortion, or tilt due to AF driving by separately controlling each of opposite ends of an AF actuator of a camera module.

According to various embodiments of the disclosure, the camera module may control driving by driver ICs, which are respectively disposed at opposite ends of an AF actuator, thereby compensating for inclination, distortion, or tilt due to AF driving.

The structure of the AF actuator according to various embodiments may also be applied to direct ball-type and shaft-type optical systems in which light passing through an optical axis of a lens of a camera from a subject is directly incident to an image sensor without being refracted. In addition, the structure of the AF actuator according to various embodiments may also be applied to a camera module including a prism-type lens-led folded type optical system.

The AF actuator according to various embodiments may ensure a high driving current by controlling opposite ends thereof with separate driver ICs, respectively, thereby improving a driving force.

In the case of the AF actuator according to various embodiments, stroke deviation at the opposite ends of the AF may be improved by applying the same stroke adjustment process to the opposite ends.

In addition, various effects directly or indirectly identified through the disclosure may be provided.

Effects that are capable of being obtained by the disclosure are not limited to those described above, and other effects not described above may be clearly understood by a person ordinarily skilled in the art to which the disclosure belongs based on the following description.

FIG. 11 is a block diagram illustrating an electronic device 1101 in a network environment 1100 according to various embodiment of the disclosure.

Referring to FIG. 11, an electronic device 1101 in a network environment 1100 may communicate with an electronic device 1102 via a first network 1198 (e.g., a short-range wireless communication network), or at least one of an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input module 1150, a sound output module 1155, a display module 1160, an audio module 1170, a sensor module 1176, an interface 1177, a connecting terminal 1178, a haptic module 1179, a camera module 1180, a power management module 1188, a battery 1189, a communication module 1190, a subscriber identification module (SIM) 1196, or an antenna module 1197. In some embodiments, at least one of the components (e.g., the connecting terminal 1178) may be omitted from the electronic device 1101, or one or more other components may be added in the electronic device 1101. In some embodiments, some of the components (e.g., the sensor module 1176, the camera module 1180, or the antenna module 1197) may be integrated into a single component (e.g., the display module 1160).

The processor 1120 may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may store a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), or an auxiliary processor 1123 (e.g., a graphics processing unit (GPU), a neural processing unit (NPU), an image signal processor (ISP), a sensor hub processor, or a communication processor (CP)) that is operable independently from, or in conjunction with, the main processor 1121. For example, when the electronic device 1101 includes the main processor 1121 and the auxiliary processor 1123, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control, for example, at least some of functions or states related to at least one component (e.g., the display module 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active (e.g., executing an application) state. According to an embodiment, the auxiliary processor 1123 (e.g., an image signal processor or a communication processor) may be implemented as a part of another component (e.g., the camera module 1180 or the communication module 1190) functionally related to the auxiliary processor 1123. According to an embodiment, the auxiliary processor (e.g., a neural processing unit (NPU)) may include a hardware structure specific to processing of an artificial intelligence model. The artificial model may be generated through machine learning. For example, this learning may be performed by the electronic device 1101 itself where artificial intelligence is executed, and may also be performed through a separate server (e.g., the server 1108). A learning algorithm may include, for example, supervised learning, unsupervised learning, semi-supervised learning, or reinforcement learning, but is not limited to the above examples. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep brief network (DBN), a bidirectional recurrent deep neural network (BRDNN), a deep Q-network, and a combination of two or more thereof, but is not limited to the above examples. Additionally or alternatively, the artificial intelligence model may include a software structure, in addition to the hardware structure.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by another component (e.g., the processor 1120) of the electronic device 1101, from the outside (e.g., a user) of the electronic device 1101. The input module 1150 may include, for example, a microphone, a mouse, a keyboard, a key (e.g., a button), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. According to an embodiment, the display module 1160 may include a touch sensor adapted to detect a touch, or a sensor circuit (e.g., a pressure sensor) adapted to measure the intensity of force incurred by the touch.

The audio module 1170 may convert a sound into an electrical signal and vice versa. According to an embodiment, the audio module 1170 may obtain the sound via the input module 1150, or output the sound via the sound output module 1155 or an external electronic device (e.g., an electronic device 1102 (e.g., a speaker or a headphone)) directly or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly or wirelessly. According to an embodiment, the interface 1177 may include, for example, a high definition multimedia interface (HDMI), a universal serial bus (USB) interface, a secure digital (SD) card interface, or an audio interface.

The connecting terminal 1178 may include a connector via which the electronic device 1101 may be physically connected with the external electronic device (e.g., the electronic device 1102). According to an embodiment, the connecting terminal 1178 may include, for example, an HDMI connector, a USB connector, an SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device 1104 via the first network 1198 (e.g., a short-range communication network, such as Bluetooth™, wireless-fidelity (Wi-Fi) direct, or infrared data association (IrDA)) or the second network 1199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify or authenticate the electronic device 1101 in a communication network, such as the first network 1198 or the second network 1199, using subscriber information (e.g., international mobile subscriber identity (IMSI)) stored in the subscriber identification module 1196.

The wireless communication module 1192 may support 5G networks and next-generation communication technologies beyond 4G networks, for example, a new radio (NR) access technology. The NR access technology may support enhanced mobile broadband (eMBB), massive machine type communications (mMTC), or ultra-reliable and low-latency communications (URLLC). The wireless communication module 1192 may support high-frequency bands (e.g., the mmWave band), for example, in order to achieve a high data transfer rate. The wireless communication module 1192 may support various technologies for ensuring performance in high-frequency bands, such as beamforming, massive multiple-input and multiple-output (massive MIMO), full dimensional MIMO (FD-MIMO), array antenna, analog beam-forming, or large-scale antenna. The wireless communication module 1192 may support various requirements specified in the electronic device 1101, an external electronic device (e.g., the electronic device 1104), or a network system (e.g., the second network 1199). According to an embodiment, the wireless communication module 1192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1197 may transmit or receive a signal or power to or from the outside (e.g., the external electronic device) of the electronic device 1101. According to an embodiment, the antenna module 1197 may include an antenna including a radiating element composed of a conductive material or a conductive pattern formed in or on a substrate (e.g., a printed circuit board (PCB)). According to an embodiment, the antenna module 1197 may include a plurality of antennas (e.g., array antennas). In such a case, at least one antenna appropriate for a communication scheme used in the communication network, such as the first network 1198 or the second network 1199, may be selected, for example, by the communication module 1190 from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197. According to various embodiments, the antenna module 1197 may form a mmWave antenna module. According to an embodiment, the mmWave antenna module may include a printed circuit board, a RFIC disposed on or adjacent to a first surface (e.g., the bottom surface) of the printed circuit board and capable of supporting a designated high-frequency band (e.g., the mmWave band), and a plurality of antennas (e.g., an array antenna) disposed on or adjacent to second surface (e.g., the top or side surface) of the printed circuit board and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the external electronic devices 1102 or 1104 may be a device of a same type as, or a different type, from the electronic device 1101. According to an embodiment, all or some of operations to be executed at the electronic device 1101 may be executed at one or more of the external electronic devices 1102, or 1104, or the server 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, mobile edge computing (MEC), or client-server computing technology may be used, for example. The electronic device 1101 may provide ultralow-latency services using, e.g., distributed computing or mobile edge computing. In another embodiment, the external electronic device 1104 may include an internet-of-things (IoT) device. The server 1108 may be an intelligent server using machine learning and/or a neural network. According to an embodiment, the external electronic device 1104 or the server 1108 may be included in the second network 1199. The electronic device 1101 may be applied to intelligent services (e.g., smart home, smart city, smart car, or healthcare) based on 5G communication technology or IoT-related technology.

Figure 12:
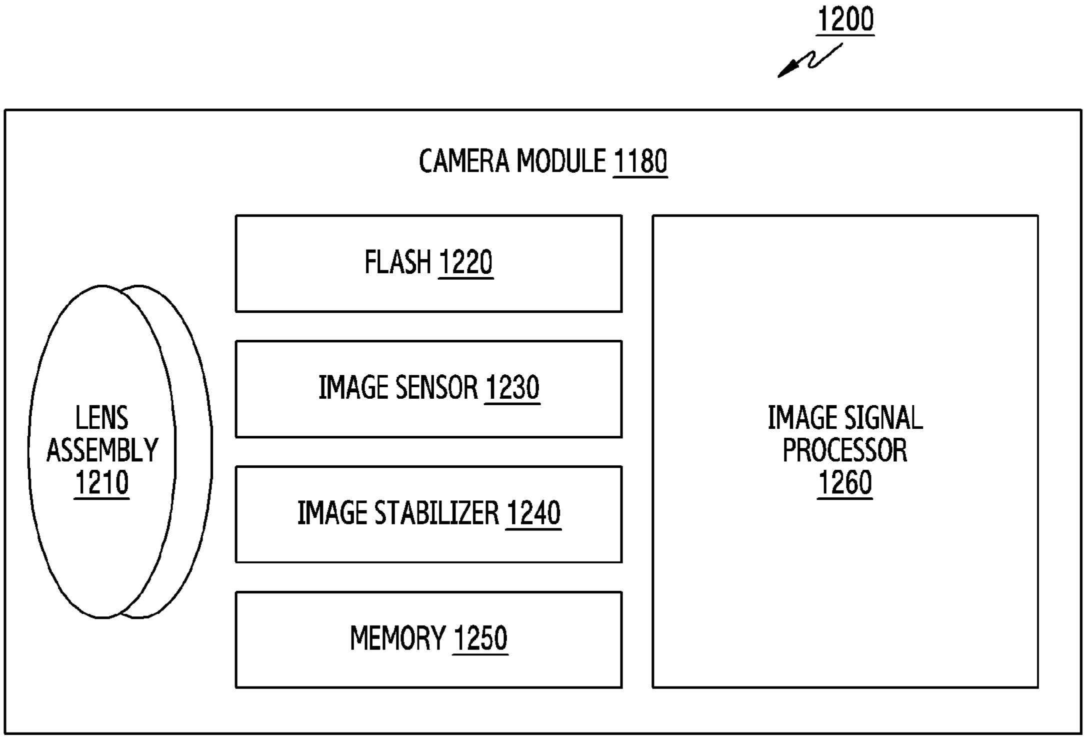
FIG. 12 is a block diagram exemplifying a camera module according to an embodiment of the disclosure.

FIG. 12 is a block diagram 1200 exemplifying a camera module 1180 according to an embodiment of the disclosure.

Referring to FIG. 12, the camera module 1180 may include a lens assembly 1210, a flash 1220, an image sensor 1230, an image stabilizer 1240, a memory 1250 (e.g., a buffer memory), or an image signal processor 1260. The lens assembly 1210 may collect light emitted from a subject to be imaged. The lens assembly 1210 may include one or more lenses. According to an embodiment, the camera module 1180 may include multiple lens assemblies 1210. In this case, the camera module 1180 may form, for example, a dual camera, a 360-degree camera, or a spherical camera. Some of multiple lens assemblies 1210 may have the same lens properties (e.g., angle of view, focal length, auto focus, f-number, or optical zoom), or at least one of the lens assemblies may have one or more lens properties different from those of the other lenses. The lens assembly 1210 may include, for example, a wide-angle lens or a telephoto lens.

The flash 1220 may emit light used to enhance the light emitted or reflected from a subject. According to an embodiment, the flash 1220 may include one or more light-emitting diodes (e.g., red-green-blue (RGB) light-emitting diodes (LEDs), white LEDs, infrared LEDs, or ultraviolet LEDs), or a xenon lamp. The image sensor 1230 may acquire an image corresponding to the subject by converting light emitted or reflected from the subject and transmitted through the lens assembly 1210 into an electrical signal. According to an embodiment, the image sensor 1230 may include one image sensor selected from image sensors having different properties, such as an RGB sensor, a black and white (BW) sensor, an IR sensor, or an ultraviolet (UV) sensor, multiple image sensors having the same properties, or multiple image sensors having different properties. Each image sensor included in the image sensor 1230 may be implemented by using, for example, a charge-coupled device (CCD) sensor or a complementary metal oxide semiconductor (CMOS) sensor.

The image stabilizer 1240 may move at least one lens included in the lens assembly 1210 or the image sensor 1230 to a specific direction or may control an operating characteristic of the image sensor 1230 (e.g., adjusting read-out timing) in response to the movement of the camera module 1180 or the electronic device 1101 including the camera module 1180. This compensates for at least some of negative effects on an image to be captured due to the above-described movements. According to an embodiment, the image stabilizer 1240 may detect the movements of the camera module 1180 or the electronic device 1101 by using a gyro sensor (not illustrated) or an acceleration sensor (not illustrated) disposed inside or outside the camera module 1180. According to an embodiment, the image stabilizer 1240 may be implemented as, for example, an optical image stabilizer The memory 1250 may at least temporarily store at least some of the images acquired via the image sensor 1230 for the next image processing task. For example, when image acquisition by shutter is delayed or multiple images are acquired at high speed, the acquired original images (e.g., Bayer-patterned images or high-resolution images) are stored in the memory 1250, and copy images (e.g., low-resolution images) corresponding to the original images may be previewed through a display module 1160. Then, when predetermined conditions (e.g., a user input or a system command) are satisfied, at least some of the original images that have been stored in the memory 1250 may be acquired and processed by, for example, the image signal processor 1260. According to an embodiment, the memory 1250 may be configured as at least a portion of the memory 1130 or as a separate memory operated independently from the memory.

The image signal processor 1260 may execute one or more image processes on the images acquired by the image sensor 1230 or the images stored in the memory 1250. The one or more image processes may include, for example, depth map generation, 3D modeling, panorama generation, feature point extraction, image synthesis, or image compensation (e.g., noise reduction, resolution adjustment, brightness adjustment, blurring, sharpening, or softening). Additionally, or alternatively, the image signal processor 1260 may perform control (e.g., exposure time control, or read-out timing control) at least one of the components (e.g., the image sensor 1230) included in the camera module 1180. Images processed by the image signal processor 1260 may be stored back in the memory 1250 for further processing or may be provided to components outside the camera module 1180 (e.g., the memory 1130, the display module 1160, the electronic device 1102, the electronic device 1104, or the server 1108). According to an embodiment, the image signal processor 1260 may be configured as at least a portion of the processor 1120 or may be configured as a separate processor operated independently of the processor 1120. When the image signal processor 1260 is configured as a processor separate from the processor 1120, the processor 1120 may cause at least one image, which is processed by the image signal processor 1260, to be displayed through the display module 1160 as it is or after further image processing.

According to an embodiment, the electronic device 1101 may include multiple camera modules 1180, which have different properties or functions, respectively. In this case, for example, at least one of the multiple camera modules 1180 may be a wide-angle camera, and at least another may be a telephoto camera. Similarly, for example, at least one of the multiple camera modules 1180 may be a front camera, and at least another may be a rear camera.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. As used herein, each of such phrases as “A or B,” “at least one of A and B,” “at least one of A or B,” “A, B, or C,” “at least one of A, B, and C,” and “at least one of A, B, or C” may include all possible combinations of the items enumerated together in a corresponding one of the phrases. As used herein, such terms as “a first”, “a second”, “the first”, and “the second”

may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 1140) including one or more instructions that are stored in a storage medium (e.g., the internal memory 1136 or external memory 1138) that is readable by a machine (e.g., the electronic device 1101). For example, a processor (e.g., the processor 1120) of the machine (e.g., the electronic device 1101) may invoke at least one of the one or more stored instructions from the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities may be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

Figure 13:
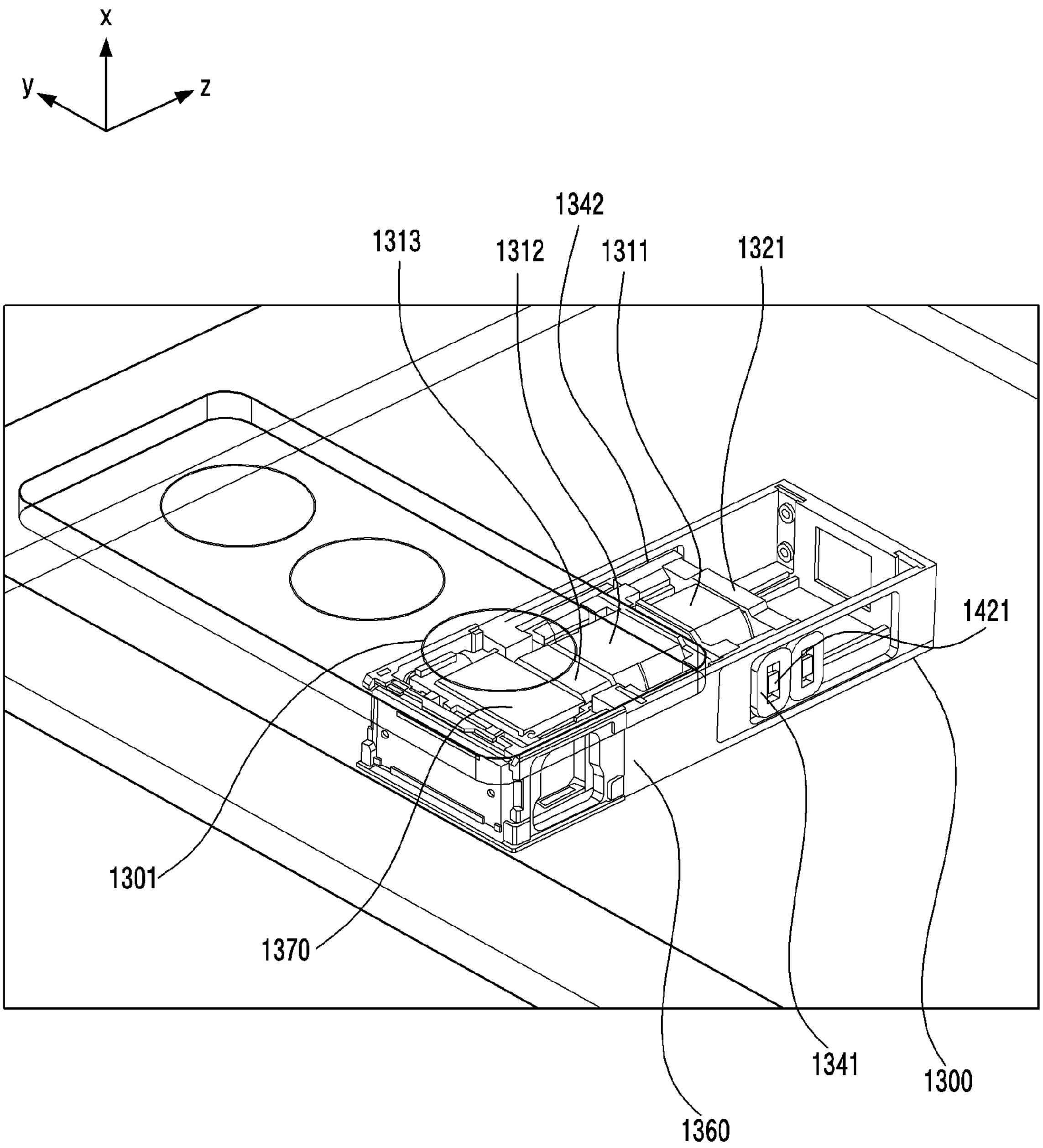
FIG. 13 is a perspective view of a camera module included in an electronic device according to an embodiment of the disclosure.

FIG. 13 is a perspective view of a camera module 1300 included in an electronic device according to an embodiment of the disclosure.

The camera module 1300 of FIG. 13 and components of the camera module 1300 may be referred to as the camera module and components of the camera module of FIGS. 1 to 12.

Referring to FIG. 13, the camera module 1300 may include at least one lens assembly of a first lens assembly 1311 and a second lens assembly 1312 installed to be movable relative to the housing 1360. In an embodiment, the camera module 1300 may further include a third lens assembly 1313 fixed to the housing 1360.

According to an embodiment, each of the first lens assembly 13 1311, the second lens assembly 13 1312, and the third lens assembly 13 1313 may include multiple lenses aligned along the first optical axis (e.g., the z-axis direction). The number of lenses and the characteristics (e.g., the magnifications) of the lenses included in each of the lens assemblies may be different. In another embodiment, at least one lens assembly of the first lens assembly 13 1311, the second lens assembly 13 1312, and the third lens assembly 1313 may include one lens.

According to an embodiment, the first lens assembly 1311 may be installed in the housing 1360 through a first lens carrier 1321. The first lens carrier 1321 may be configured to accommodate the first lens assembly 1311. The first lens assembly 1311 may be coupled to the first lens carrier 1321, and may move integrally with the first lens carrier 1321. For example, the first lens carrier 1321 for accommodating the first lens assembly 1311 may move in the +z-axis direction and/or the −z-axis direction with respect to the housing 1360. In an embodiment, the first lens assembly 1311 and the first lens carrier 1321 may be integrally formed. The configuration above described may also be applied to the second lens assembly 1312 in the same way.

According to an embodiment, the third lens assembly 1313 may be installed in the housing 1360. The third lens assembly 1313 may be fixed to the housing 1360, and may be disposed so as not to be movable relative to the housing 1360. In another embodiment, the third lens assembly 1313 may be installed in the housing 1360 through a third lens carrier (not shown), and the third lens carrier may move in the +z-axis direction and/or the −z-axis direction with respect to the housing 1360.

According to an embodiment, the camera module 1300 may include the prism 1370. The prism 1370 may be positioned in front of the third lens assembly 1313. The prism 1370 may change and reflect light incident along the second optical axis (e.g., the −x-axis direction) by about 90 degrees so that the light travels along the first optical axis (e.g., the +z-axis direction). The light, which is incident to the prism 1370 along the second optical axis (e.g., the −x-axis direction) through the camera hole 1301 of the electronic device 100, may be reflected by the prism 1370, and may be incident to the third lens assembly 1313 along the first optical axis (e.g., the +z-axis direction).

According to an embodiment, the light reflected by the prism 1370 may travel from the front side (e.g., the −z-axis direction) of the third lens assembly 1313 to the rear side (e.g., the +z-axis direction) of the first lens assembly 1311. The light, which is incident from the front side of the third lens assembly 1313 to the foremost lens (e.g., the lens which at least partially faces the prism 1370) of the third lens assembly 1313, may travel to the rear side (e.g., to an image sensor) of the first lens assembly 1311 through the multiple lenses of the third lens assembly 1313, the second lens assembly 1312, and the first lens assembly 1311.

According to an embodiment, the camera module 1300 may include a configuration (e.g., the AF actuator) for performing an AF function and/or an optical zoom function for light reflected in the first optical axis (e.g., the +z-axis direction) by the prism 1370. In an embodiment, the camera module 1300 may include at least one lens assembly of the third lens assembly 1313 fixed to the housing 1360, the second lens assembly 1312 installed through a second lens carrier 1322 to be movable in the +z-axis direction and/or the −z-axis direction with respect to the housing 1360, and the first lens assembly 1311 installed through the first lens carrier 1321 to be movable in the +z-axis direction and/or the −z-axis direction with respect to the housing 1360.

According to an embodiment, the first drive magnet may be coupled to the surface of the first lens carrier 1321, which is positioned in the −y-axis direction, and the first coil 1341 may be coupled to one surface of the housing 1360, which faces the first drive magnet. According to an embodiment, the second drive magnet may be coupled to the surface of the second lens carrier 1322, which is positioned in the +y-axis direction, and the second coil 1342 may be coupled to one surface of the housing 1360, which faces the second drive magnet.

According to an embodiment, the camera module 1300 may include a control circuit electrically connected to each of coils included in the first coil 1341 and the second coil 1342. The control circuit may control a current applied to at least one coil of coils included in the first coil 1341 and coils included in the second coil 1342, in order to implement the AF function and/or the optical zoom function of the camera module 1300. For example, the control circuit may control a current applied to at least one coil of coils included in the first coil 1341 so as to control the movement (e.g., the movement in the +z-axis direction or the −z-axis direction) of the first lens assembly 1311. In case that a current is applied to at least one coil of coils included in the first coil 1341, the first lens assembly 1311 may move through an interaction between the coil to which a current is applied and the first drive magnet. For another example, the control circuit may control a current applied to at least one coil of coils included in the second coil 1341 so as to control the movement (e.g., the movement in the +z-axis direction or the −z-axis direction) of the second lens assembly 1312. In case that a current is applied to at least one coil of coils included in the second coil 1342, the second lens assembly 1312 may move through an interaction between the coil to which a current is applied and the second drive magnet.

The AF actuator according to an embodiment may include at least one AF driver IC. For example, both ends of the AF actuator may be controlled by arranging the first AF driver IC 1412 and the second AF driver IC (not shown) at both ends of the AF actuator.

According to an embodiment, first coil 1341 and second coil 1342 may be referred to by first AF coil (e.g., first AF coil 511 of FIG. 5) and second AF coil (e.g., first AF coil 521 of FIG. 5), respectively. Further, the third AF magnet and the fourth AF magnet may be referenced by the first AF magnet (e.g., the first AF magnet 513 in FIG. 5) and the second AF magnet (e.g., the second AF magnet 523 in FIG. 5), respectively. In addition, the at least one driver IC (e.g., first driver IC 1412) may be referenced by any of the driver ICs described above. For example, the at least one driver IC of FIG. 13 may perform the same and/or similar operations as the driver IC of FIG. 2. In an example, the first AF driver IC 1412 and the second AF driver IC may perform the same and/or similar operations as the first AF driver IC (e.g., the first AF driver IC 512 of FIG. 5) and the second AF driver IC (e.g., the second AF driver IC 522 of FIG. respectively. Thus, the first AF driver IC 1412 may include an AF position sensor that performs operations similar to the first AF position sensor. Further, the second AF driver IC (not shown) may include an AF position sensor that performs operations similar to the second AF position sensor.

While the disclosure has been shown and described with reference to various embodiments thereof, it will be understood by those skilled in the art that various changes in form and details may be made therein without departing from the spirit and scope of the disclosure as defined by the appended claims and their equivalents.

As described above, an electronic device (e.g., the electronic device 100 of FIG. 1) according to an embodiment of the disclosure may comprise a housing, a lens assembly comprising at least one lens aligned along an optical axis, and an auto-focus (AF) driver to move the lens assembly within the housing. The AF actuator comprises a first AF magnet disposed on a first side of the lens assembly, a second AF magnet disposed on a second side of the lens assembly opposite to the first side, a first AF coil disposed to face the first AF magnet, a first position sensor configured to detect a first position of the first AF magnet, a second AF coil disposed to face the second AF magnet, a second position sensor configured to detect a second position of the second AF magnet, and at least one driving circuit configured to control a current applied to the first AF coil based on the first position of the first AF magnet detected via the first position sensor and configured to control a current applied to the second AF coil based on the second position of the second AF magnet detected via the second position sensor to move the lens assembly in a direction of the optical axis.

According to an embodiment, the at least one driving circuit is further configured to: control the current applied to the first AF coil based on the first position and the second position, and control the current applied to the second AF coil based on the first position and the second position.

According to an embodiment, the at least one driving circuit is configured to control at least one of the current applied to the first AF coil or the current applied to the second AF coil to compensate for a tilt of the lens assembly based on at least one of the first position or the second position.

According to an embodiment, the electronic device further comprises a memory. The memory is configured to: store a first calibration value related to the current applied to the first AF coil via the at least one driving circuit, and store a second calibration value related to the current applied to the second AF coil via the at least one driving circuit.

According to an embodiment, the electronic device further comprises at least one processor. The at least one processor is configured to: determine a first value for controlling the current applied to the first AF coil based on the first calibration value stored in the memory, and determine a second value for controlling the current applied to the second calibration value stored in the memory.

According to an embodiment, the electronic device further comprises at least one processor configured to determine a first calibration position by mapping a height of the first AF magnet from a reference position based on the first calibration value, and determine a second calibration position by mapping a height of the second AF magnet from the housing based on the second calibration value.

According to an embodiment, the at least one driving circuit is configured to: control the current applied to the first AF coil based on a comparison of the first calibration position and a first current position measured via the first position sensor, and control the current applied to the second AF coil based on a comparison of the second calibration position and a second current position measured via the second position sensor.

According to an embodiment, the at least one driving circuit comprises: a first driving circuit configured to control the current applied to the first AF coil based on at least one of the first position or the second position, and a second driving circuit configured to control the current applied to the second AF coil based on at least one of the first position or the second position.

According to an embodiment, the first position sensor comprises a first AF Hall sensor therein, and the second position sensor comprises a second AF Hall sensor therein. The first driving circuit is configured to measure a position of the first AF magnet relative to the first AF Hall sensor by using the first AF Hall sensor. The second driving circuit is configured to measure a position of the second AF magnet relative to the second AF Hall sensor by using the second AF Hall sensor.

According to an embodiment, the current applied to the first AF coil by the at least one driving circuit is different from the current applied to the second AF coil by the at least one driving circuit.

According to an embodiment, the electronic device (e.g., the AF carrier) further comprises at least one AF ball. The AF actuator is configured to control the lens assembly to move in the optical axis direction by rolling of the at least one AF ball.

According to an embodiment, the electronic device (e.g., the AF carrier) further comprises at least one AF shaft. The AF actuator is configured to control the lens assembly to move in the optical axis direction by sliding of the at least one AF shaft.

According to an embodiment, the electronic device further comprises a prism; and an image sensor configured to acquire the light passing through the lens assembly and the prism. The prism is disposed to refract a path of light passing through the lens assembly toward the image sensor, or disposed to refract a path of light to be incident to the lens assembly.

According to an embodiment, the electronic device further comprises an AF driver integrated circuit (IC) connected to the at least one driving circuit. The AF driver IC is configured to control each of the at least one driving circuit.

According to an embodiment, the at least one circuit is configured to control the current applied to the first AF coil based on a position of the second AF magnet with respect to the second position sensor. The position is acquired by using the second position sensor. The at least one circuit is configured to control the current applied to the second AF coil based on a position of the first AF magnet with respect to the first position sensor, wherein the position is acquired by using the first position sensor.

As described above, a camera module (e.g., the camera module 180 of FIG. 1) according to an embodiment of the disclosure may comprise a housing, a lens assembly comprising at least one lens aligned along an optical axis, and an auto-focus (AF) driver to move the lens assembly within the housing. The AF actuator comprises: a first AF magnet disposed on a first side of the lens assembly, a second AF magnet disposed on a second side of the lens assembly opposite to the first side, a first AF coil disposed to face the first AF magnet, a first position sensor configured to detect a first position of the first AF magnet, a second AF coil disposed to face the second AF magnet, a second position sensor configured to detect a second position of the second AF magnet, and at least one driving circuit configured to control a current applied to the first AF coil based on the first position of the first AF magnet detected via the first position sensor and configured to control a current applied to the second AF coil based on the second position of the second AF magnet detected via the second position sensor to move the lens assembly in a direction of the optical axis.

According to an embodiment, the at least one driving comprises a first driving circuit controlling the current applied to the first AF coil and a second driving circuit controlling the current applied to the second AF coil. The first driving circuit comprises a first memory configured to store a first calibration value related to the current applied to the first AF coil via the first driving circuit. The second driving circuit comprises a second memory configured to store a second calibration value related to the current applied to the second AF coil via the second driving circuit.

According to an embodiment, the first driving circuit is configured to control the current applied to the first AF coil based on the first calibration value. The second driving circuit is configured to control the current applied to the second AF coil based on the second calibration value.

According to an embodiment, the first calibration value and the second calibration value are values that compensate for a tilt generated from a height difference between the first surface and the second surface of the lens assembly with respect to a reference position.

According to an embodiment, the first position sensor comprises a first AF Hall sensor therein and is configured to measure a position of the first AF magnet relative to the first AF Hall sensor via the first AF Hall sensor. the second position sensor comprises a second AF Hall sensor therein and is configured to measure a position of the second AF magnet relative to the second AF Hall sensor via the second AF Hall sensor.

According to an embodiment, the first driving circuit is configured to: measure a first current position, which is a height of the first AF magnet from the reference position, via the first AF Hall sensor, compare a first calibration position determined based on the first calibration value with the first current position, and move the lens assembly in the optical axis direction by controlling the current applied to the first AF coil based on a comparison result. The second driving circuit is configured to: measure a second current position, which is a height of the second AF magnet from the reference position, via the second AF Hall sensor, compare a second calibration position determined based on the second calibration value with the second current position, and move the lens assembly in the optical axis direction by controlling the current applied to the second AF coil based on a comparison result.

What is claimed is:

1. An electronic device comprising:

a housing;

a lens assembly comprising at least one lens aligned along an optical axis; and an auto-focus (AF) actuator to move the lens assembly within the housing, wherein the AF actuator comprises:

a first AF magnet disposed on a first side of the lens assembly, a second AF magnet disposed on a second side of the lens assembly opposite to the first side, a first AF coil disposed to face the first AF magnet, a first position sensor configured to detect a first position of the first AF magnet, a second AF coil disposed to face the second AF magnet, a second position sensor configured to detect a second position of the second AF magnet, a first AF driver integrated circuit (IC) including first memory configured to store a first calibration value and a first driving circuit configured to control a current applied to the first AF coil based on the first position of the first AF magnet detected via the first position sensor, a second AF driver IC including second memory configured to store a second calibration value and a second driving circuit configured to control a current applied to the second AF coil based on the second position of the second AF magnet detected via the second position sensor to move the lens assembly in a direction of the optical axis, the second memory being separate from the first memory, wherein the first driving circuit and the second driving circuit are configured to allow opposite ends of the AF actuator to have substantially a same stroke, wherein the current applied to the second AF coil is different from the current applied to the first AF coil, wherein the first AF driver IC is disposed inside a periphery of the first AF coil and configured to control the first driving circuit based on the first calibration value stored in the first memory, and wherein the second AF driver IC is disposed inside a periphery of the second AF coil and configured to control the second driving circuit based on the second calibration value stored in the second memory.

2. The electronic device of claim 1, wherein the first driving circuit is further configured to control the current applied to the first AF coil based on the first position and the second position, and wherein the second driving circuit is further configured to control the current applied to the second AF coil based on the first position and the second position.

3. The electronic device of claim 1, wherein the first driving circuit is configured to control the current applied to the first AF coil or the second driving circuit is configured to control the current applied to the second AF coil to compensate for a tilt of the lens assembly based on at least one of the first position or the second position.

4. The electronic device of claim 1, further comprising: third memory, wherein the:

first calibration value is related to the current applied to the first AF coil via the first driving circuit, and wherein the second calibration value is related to the current applied to the second AF coil via the second driving circuit.

5. The electronic device of claim 4, further comprising at least one processor, wherein the third memory stores computer-executable instructions that, when executed by the at least one processor individually or collectively, causing the electronic device to:

determine a first value for controlling the current applied to the first AF coil based on the first calibration value stored in the first memory, and determine a second value for controlling the current applied to the second AF coil based on the second calibration value stored in the second memory.

6. The electronic device of claim 4, further comprising at least one processor, wherein the third memory stores computer-executable instructions that, when executed by the at least one processor individually or collectively, cause the electronic device to determine a first calibration position by mapping a height of the first AF magnet from a reference position based on the first calibration value, and determine a second calibration position by mapping a height of the second AF magnet from the housing based on the second calibration value.

7. The electronic device of claim 6, wherein the first driving circuit is configured to control the current applied to the first AF coil based on a comparison of the first calibration position and a first current position measured via the first position sensor, and wherein the second driving circuit is configured to control the current applied to the second AF coil based on a comparison of the second calibration position and a second current position measured via the second position sensor.

8. The electronic device of claim 6, wherein the third memory stores computer-executable instructions that, when executed by the at least one processor individually or collectively, further cause the electronic device to determine that tilt compensation is required when a difference between the first calibration position and the second calibration position is greater than or equal to a threshold value.

9. The electronic device of claim 1, wherein the first position sensor comprises a first AF Hall sensor therein, and the second position sensor comprises a second AF Hall sensor therein, wherein the first driving circuit is configured to measure a position of the first AF magnet relative to the first AF Hall sensor by using the first AF Hall sensor, and wherein the second driving circuit is configured to measure a position of the second AF magnet relative to the second AF Hall sensor by using the second AF Hall sensor.

10. The electronic device of claim 1, further comprising at least one AF ball, and wherein the AF actuator is configured to control the lens assembly to move in the optical axis direction by rolling of the at least one AF ball.

11. The electronic device of claim 1, further comprising at least one AF shaft, and wherein the AF actuator is configured to control the lens assembly to move in the optical axis direction by sliding of the at least one AF shaft.

12. The electronic device of claim 1, further comprising:

a prism; and an image sensor configured to acquire light passing through the lens assembly and the prism, wherein the prism is disposed to refract a path of light passing through the lens assembly toward the image sensor, or disposed to refract a path of light to be incident to the lens assembly.

13. The electronic device of claim 1, further comprising:

an AF driver integrated circuit (IC) connected to the first driving circuit and the second driving circuit, wherein the AF driver IC is configured to control each of the first driving circuit and the second driving circuit.

14. The electronic device of claim 1, wherein first driving circuit is configured to control the current applied to the first AF coil further based on the second position of the second AF magnet with respect to the second position sensor, and wherein the second driving circuit is configured to control the current applied to the second AF coil further based on the first position of the first AF magnet with respect to the first position sensor.

15. A camera module comprising:

a housing;

a lens assembly comprising at least one lens aligned along an optical axis; and an auto focus (AF) actuator to move the lens assembly within the housing, wherein the AF actuator comprises:

a first AF magnet disposed on a first side of the lens assembly, a second AF magnet disposed on a second side opposite to the first side of the lens assembly, a first AF coil disposed to face the first AF magnet, a first position sensor configured to detect a first position of the first AF magnet, a second AF coil disposed to face the second AF magnet, a second position sensor configured to detect a second position of the second AF magnet, a first AF driver integrated circuit (IC) including first memory configured to store a first calibration value and a first driving circuit configured to move the lens assembly in the optical axis by controlling current applied to the first AF coil, a second AF driver IC including second memory configured to store a second calibration value and a second driving circuit configured to move the lens assembly in the optical axis by controlling current applied to the second AF coil, the second memory being separated from the first memory, wherein the first driving circuit and the second driving circuit is configured to allow opposite ends of the AF actuator to have substantially same stroke, wherein the current applied to the second AF coil is different from the current applied to the first AF coil, wherein the first AF driver IC is disposed inside a periphery of the first AF coil and configured to control the first driving circuit based on the first calibration value stored in the first memory, and wherein the second AF driver IC is disposed inside a periphery of the second AF coil and configured to control the second driving circuit based on the second calibration value stored in the second memory.

16. The camera module of claim 15, wherein first calibration value is related to the current applied to the first AF coil via the first driving circuit, and wherein the second calibration value is related to the current applied to the second AF coil via the second driving circuit.

17. The camera module of claim 16, wherein the first driving circuit is configured to control the current applied to the first AF coil based on the first calibration value, and wherein the second driving circuit is configured to control the current applied to the second AF coil based on the second calibration value.

18. The camera module of claim 17, wherein the first calibration value and the second calibration value are values that compensate for a tilt generated from a height difference between a first surface and a second surface of the lens assembly with respect to a reference position.

19. The camera module of claim 18, wherein the first position sensor comprises a first AF Hall sensor therein and is configured to measure a position of the first AF magnet relative to the first AF Hall sensor via the first AF Hall sensor, and wherein the second position sensor comprises a second AF Hall sensor therein and is configured to measure a position of the second AF magnet relative to the second AF Hall sensor via the second AF Hall sensor.

20. The camera module of claim 19, wherein the first driving circuit is configured to:

measure a first current position, which is a height of the first AF magnet from the reference position, via the first AF Hall sensor, compare a first calibration position determined based on the first calibration value with the first current position, and move the lens assembly in a direction of the optical axis by controlling the current applied to the first AF coil based on a comparison result, and wherein the second driving circuit is configured to:

measure a second current position, which is a height of the second AF magnet from the reference position, via the second AF Hall sensor, compare a second calibration position determined based on the second calibration value with the second current position, and move the lens assembly in the optical axis direction by controlling the current applied to the second AF coil based on a comparison result.

* * * * *